United States Patent
Uchida et al.

(10) Patent No.: US 9,953,763 B2
(45) Date of Patent: Apr. 24, 2018

(54) WIRELESS POWER TRANSMISSION SYSTEM AND WIRELESS POWER TRANSMISSION METHOD

(71) Applicant: FUJITSU LIMITED, Kawasaki-shi, Kanagawa (JP)

(72) Inventors: Akiyoshi Uchida, Akashi (JP); Kazuyuki Ozaki, Machida (JP); Masakazu Taguchi, Kobe (JP); Satoshi Shimokawa, Kawasaki (JP); Hiroyasu Kawano, Ebina (JP); Kiyoto Matsui, Miki (JP)

(73) Assignee: FUJITSU LIMITED, Kawasaki (JP)

( * ) Notice: Subject to any disclaimer, the term of this patent is extended or adjusted under 35 U.S.C. 154(b) by 394 days.

(21) Appl. No.: 14/492,375

(22) Filed: Sep. 22, 2014

(65) Prior Publication Data
US 2015/0008736 A1 Jan. 8, 2015

Related U.S. Application Data

(63) Continuation of application No. PCT/JP2013/059107, filed on Mar. 27, 2013.

(30) Foreign Application Priority Data

Mar. 28, 2012 (JP) ................................. 2012-074001
Aug. 1, 2012 (JP) ................................. 2012-171261

(51) Int. Cl.
*H02J 1/10* (2006.01)
*H02J 3/38* (2006.01)
(Continued)

(52) U.S. Cl.
CPC ............ *H01F 38/14* (2013.01); *B60L 11/182* (2013.01); *H02J 5/005* (2013.01); *H02J 7/025* (2013.01);
(Continued)

(58) Field of Classification Search
CPC ................................. H02J 17/00; H02J 5/005
(Continued)

(56) References Cited

U.S. PATENT DOCUMENTS

| 7,825,543 B2 | 11/2010 | Karalis | |
| 2010/0188041 A1* | 7/2010 | Mizuo | H02J 7/025 320/108 |

(Continued)

FOREIGN PATENT DOCUMENTS

| JP | 2007-195264 A | 8/2007 |
| JP | 2008-283789 A | 11/2008 |

(Continued)

OTHER PUBLICATIONS

H. Shoki, et al.; "Standardization Trends on Wireless Power Transmission;" The Institute of Electronics, Information and Communication Engineers; (Technical Report of IEICE); WPT2011-19; Dec. 2011 (6 Sheets)/ p. 2 of specification.

(Continued)

*Primary Examiner* — Carlos Amaya
(74) *Attorney, Agent, or Firm* — Kratz, Quintos & Hanson, LLP

(57) ABSTRACT

A wireless power transfer system includes a plurality of power sources and at least one power receiver, in which power transfer from the power sources to the power receiver is performed in wireless by using magnetic field resonance or electric field resonance. In the system, one of the plurality of power sources is designated as a master power source and the other one or more power sources are designated as slave power sources. In addition, the master power source controls the plurality of power sources and the at least one power receiver to perform the power transfer. This allows the system to perform the power transfer in an optimum state.

20 Claims, 44 Drawing Sheets

(51) Int. Cl.
    *H02J 7/34*     (2006.01)
    *H01F 38/14*     (2006.01)
    *H02J 50/90*     (2016.01)
    *H02J 50/80*     (2016.01)
    *H02J 50/60*     (2016.01)
    *H02J 50/50*     (2016.01)
    *H02J 50/40*     (2016.01)
    *H02J 50/12*     (2016.01)
    *H02J 5/00*     (2016.01)
    *H02J 7/02*     (2016.01)
    *B60L 11/18*     (2006.01)
    *H04B 5/00*     (2006.01)
    *H02J 17/00*     (2006.01)

(52) U.S. Cl.
    CPC ............. *H02J 50/12* (2016.02); *H02J 50/40* (2016.02); *H02J 50/50* (2016.02); *H02J 50/60* (2016.02); *H02J 50/80* (2016.02); *H02J 50/90* (2016.02); *H04B 5/0037* (2013.01); *H02J 17/00* (2013.01); *Y10T 307/305* (2015.04)

(58) Field of Classification Search
    USPC .................................................. 307/104, 18
    See application file for complete search history.

(56) References Cited

U.S. PATENT DOCUMENTS

| | | |
|---|---|---|
| 2010/0244580 A1 | 9/2010 | Uchida |
| 2010/0244581 A1 | 9/2010 | Uchida |
| 2011/0050164 A1 | 3/2011 | Partovi et al. |
| 2011/0148349 A1 | 6/2011 | Kim et al. |
| 2011/0204845 A1* | 8/2011 | Paparo .................... H01F 38/14 320/108 |
| 2012/0194000 A1 | 8/2012 | Uchida |
| 2012/0200151 A1* | 8/2012 | Obayashi .............. B60L 11/123 307/9.1 |
| 2013/0069444 A1* | 3/2013 | Waffenschmidt .... H01R 13/514 307/104 |
| 2013/0270923 A1 | 10/2013 | Cook et al. |

FOREIGN PATENT DOCUMENTS

| | | |
|---|---|---|
| JP | 2010-178498 A | 8/2010 |
| JP | 2010-239816 A1 | 10/2010 |
| JP | 2012-005207 | 1/2012 |
| JP | 2012-5207 A1 | 1/2012 |
| JP | 2012005207 A * | 1/2012 |
| KR | 10-2010-0134774 A | 12/2010 |
| KR | 20110135541 A | 12/2011 |
| WO | 2008-002164 A1 | 1/2008 |
| WO | 2011/064879 A1 | 6/2011 |
| WO | 2011/143539 A1 | 11/2011 |

OTHER PUBLICATIONS

International Search Report for International Application No. PCT/JP2013/059107 dated Jun. 18, 2013.
Supplementary Partial European Search Report dated Mar. 3, 2015, from corresponding EP application.
EESR(SESR: Supplementary European Search Report) dated Jul. 1, 2015 from corresponding EP Application No. 13770008.4.
Office Action of MX Patent Application No. MX/a12014/011655 dated Jul. 23, 2015, with full translation.
Office Action of JP Patent Application No. 2014-507979 dated Aug. 27, 2015 (dated Sep. 1, 2015), with partial Translation of the Office Action.
Office Action of AU Patent Application No. 2013241252 dated Oct. 12, 2015,.
Office Action (Notice of Preliminary Rejection) of Korean Patent Application No. 10-2014-7026931 dated Feb. 29, 2016, with English translation of the Office Action.
Office Action of Canadian Patent Application No. 2868101 dated Feb. 16, 2016.
Office Action of corresponding Chinese Patent Application No. 201380016600.0 dated Jun. 8, 2016, with partial translation.
Office Action (Patent Examination Report No. 2) of Australian Patent Application No. 2013241252 dated Mar. 1, 2016.
Chinese Application No. 201380016600: Notification of the Second Office Action dated Feb. 7, 2017.
Office Action of Korean Patent Application No. 10-2014-7026391 dated Oct. 31, 2016; partial translation of the Office Action.
Japanese Application No. 2016-129328: Notification of Reasons for Refusal dated Mar. 28, 2017.
Office Action dated Aug. 16, 2017, issued in copending Japanese patent application 2016-129328 by the Japanese Patent Office (three pages) with English-language translation (four pages).
Kashihara et al., "Design, implementation, and evaluation of a synchronization-based data gathering scheme for senor networks in buildings," The Institute of Electronics Information and Communication Engineers, IEICE Technical Report, ISSN 0913-5685, vol. 105, No. 628, pp. 19-24 (2006), including English abstract.
Office Action dated Dec. 8, 2017, issued in copending Canadian Patent Application No. 2,868,101 (6 pages).
Office Action dated Dec. 8, 2017, issued in copending Australian Patent Application No. 2016234966 (5 pages).

\* cited by examiner

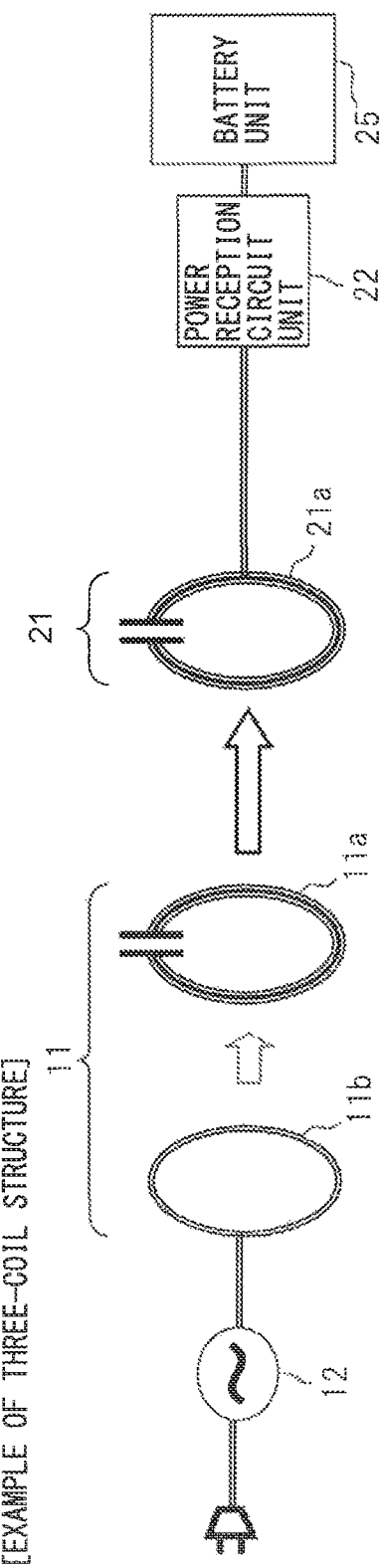

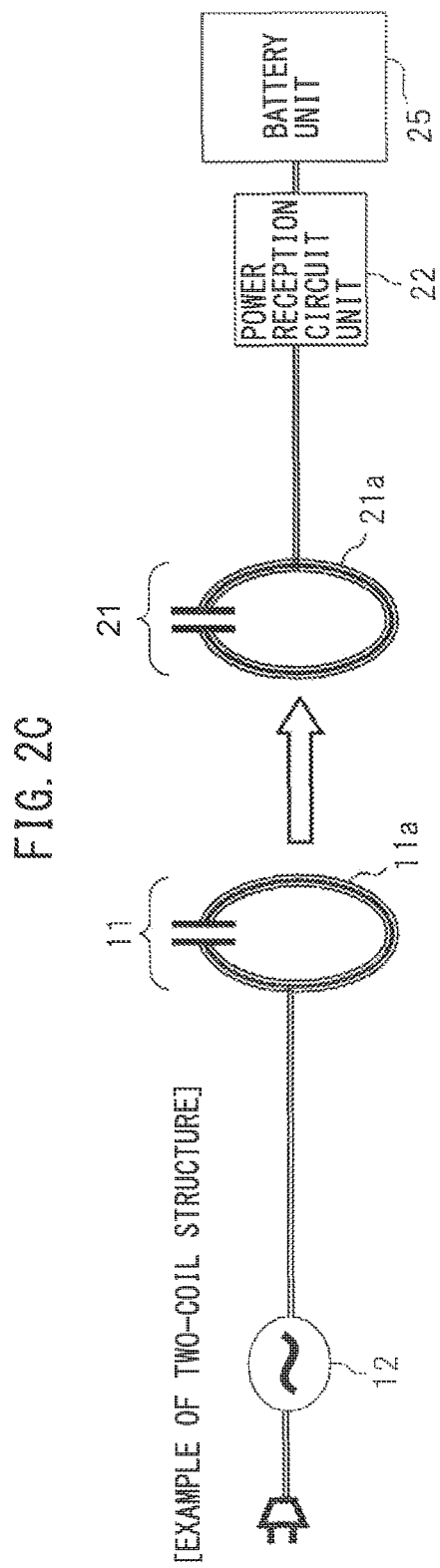

(TO POWER RECEPTION CIRCUIT UNIT 22)

(TO POWER RECEPTION CIRCUIT UNIT 22)

[IN-PHASE OUTPUT]

FIG. 6B

| | WITHIN MASTER COMMUNICATION AREA | WITHIN SLAVE COMMUNICATION AREA | WITHIN MASTER POWER TRANSFER AREA | WITHIN SLAVE POWER TRANSFER AREA | OPERATION |
|---|---|---|---|---|---|
| POWER RECEIVER 2A | × | × | × | × | WAITS FOR COMMUNICATION FROM POWER SOURCE |
| POWER RECEIVER 2B | ○ | × | × | × | COMMUNICATES WITH POWER SOURCE 1A →CONFIRMED TO BE OUTSIDE POWER AREA |
| POWER RECEIVER 2C | ○ | ○ | × | × | COMMUNICATES WITH POWER SOURCES 1A AND 1B →CONFIRMED TO BE OUTSIDE POWER AREA |
| POWER RECEIVER 2D | ○ | ○ | ○ | × | COMMUNICATES WITH POWER SOURCES 1A AND 1B →CONFIRMED TO BE WITHIN POWER AREA OF 1A |
| POWER RECEIVER 2E | ○ | ○ | ○ | ○ | COMMUNICATES WITH POWER SOURCES 1A AND 1B →CONFIRMED TO BE WITHIN POWER AREAS OF 1A AND 1B |

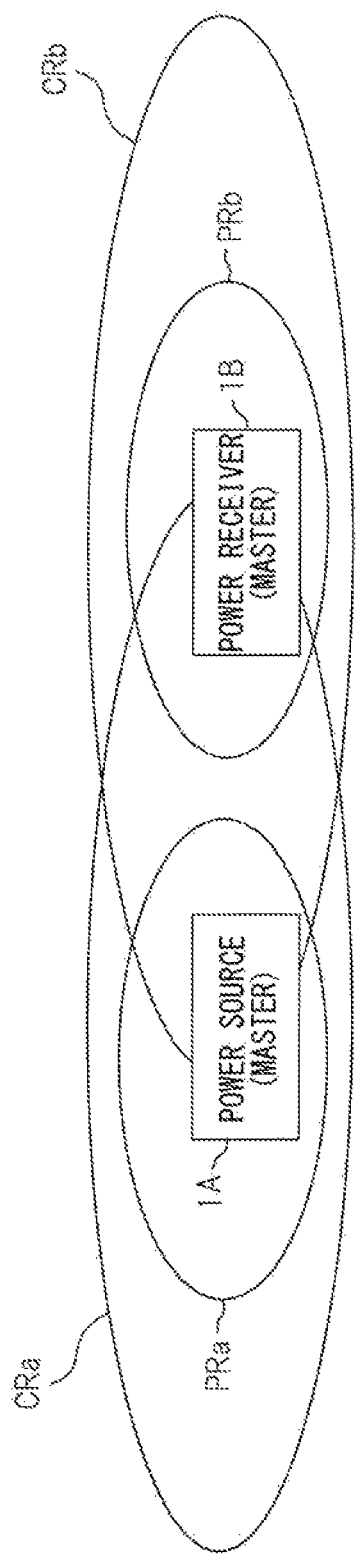

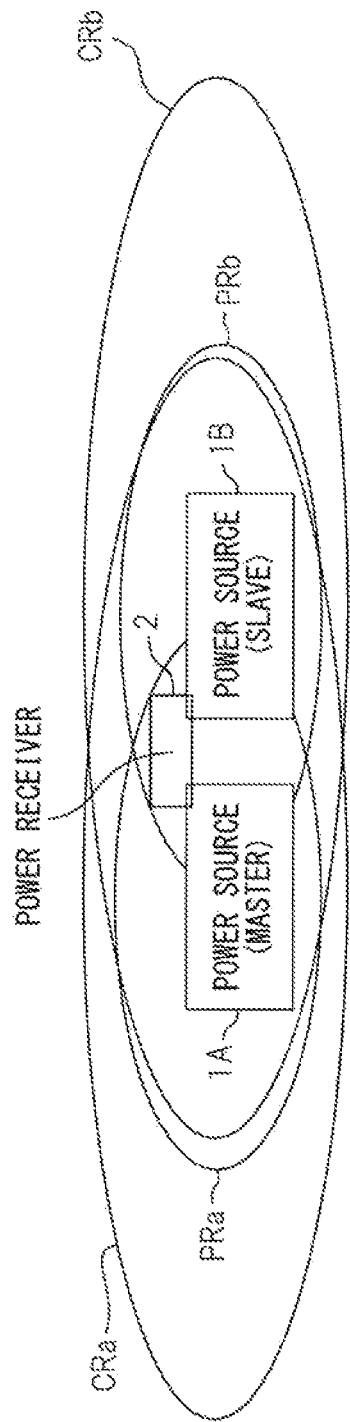

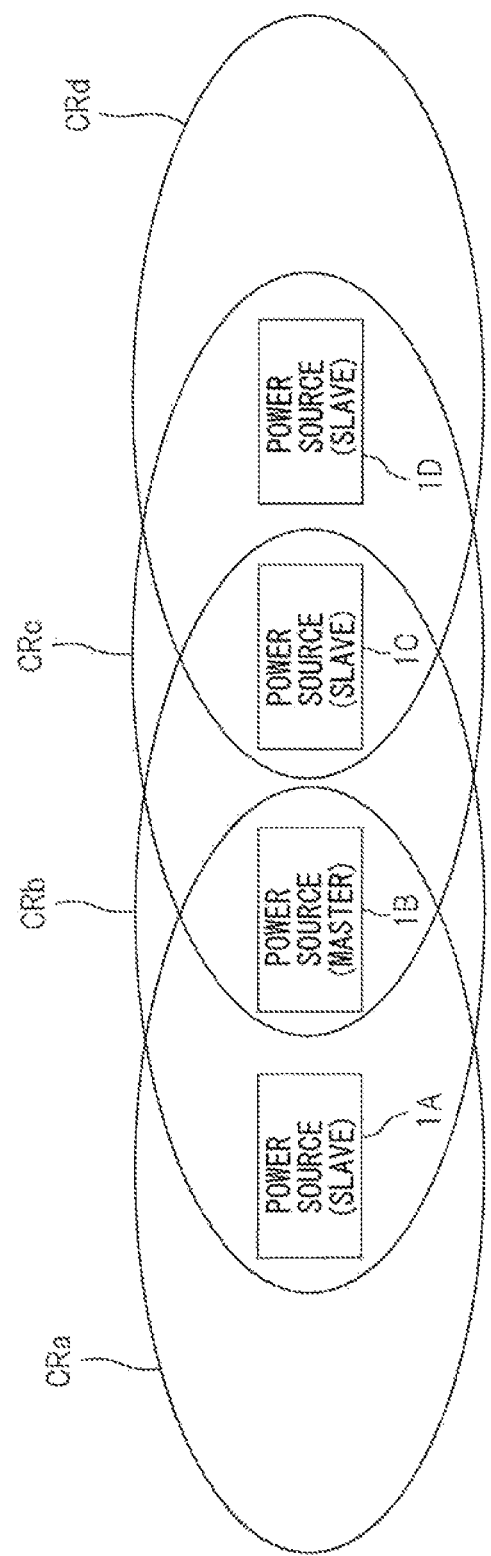

[2-DIMENSIONAL CHARGING]

EQUAL RECEIVED POWER+EQUAL
EFFICIENCY=TRANSMITTED POWER TO ⇒ SIMULTANEOUS TRANSMISSION
INDIVIDUAL POWER RECEIVERS IS SAME    MODE IS POSSIBLE

[3-DIMENSIONAL CHARGING]

EQUAL RECEIVED POWER+DIFFERENT
EFFICIENCIES=TRANSMITTED POWER TO ⇒ TIME DIVISION
INDIVIDUAL POWER RECEIVERS IS DIFFERENT    TRANSMISSION MODE

[2-DIMENSIONAL CHARGING]

DIFFERENT RECEIVED POWERS+EQUAL
EFFICIENCY=TRANSMITTED POWER TO
INDIVIDUAL POWER RECEIVERS IS DIFFERENT ⇒ TIME DIVISION TRANSMISSION MODE

[3-DIMENSIONAL CHARGING]

DIFFERENT RECEIVED POWERS+EQUAL
EFFICIENCY=TRANSMITTED POWER TO
INDIVIDUAL POWER RECEIVERS IS DIFFERENT ⇒ TIME DIVISION TRANSMISSION MODE

FIG. 10

| | WITHIN COMMUNICATION AREA | WITHIN HUMAN DETECTION SENSOR AREA | WITHIN POWER TRANSFER AREA | OPERATION |
|---|---|---|---|---|
| POWER RECEIVER 2A | × | × | × | WAITS FOR COMMUNICATION FROM POWER SOURCE |
| POWER RECEIVER 2B | ○ | × | × | COMMUNICATES WITH POWER SOURCE→ CONFIRMED TO BE OUTSIDE POWER AREA |
| POWER RECEIVER 2C | ○ | ○ | × | COMMUNICATES WITH POWER SOURCE→ CONFIRMED TO BE OUTSIDE POWER AREA |
| POWER RECEIVER 2D | ○ | ○ | ○ | COMMUNICATES WITH POWER SOURCE→ CONFIRMED TO BE WITHIN POWER AREA→ CONFIRMED BY HUMAN DETECTION SENSOR |

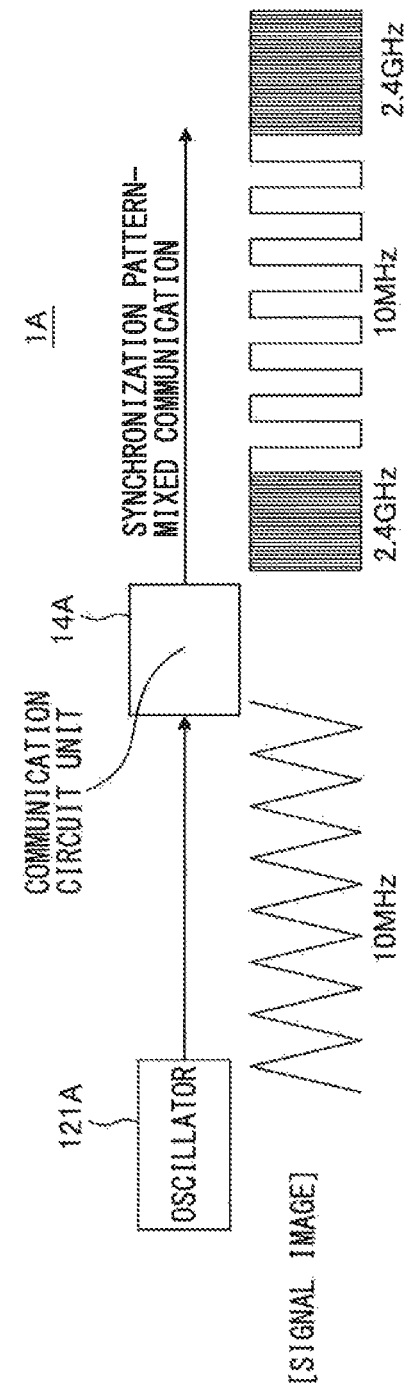

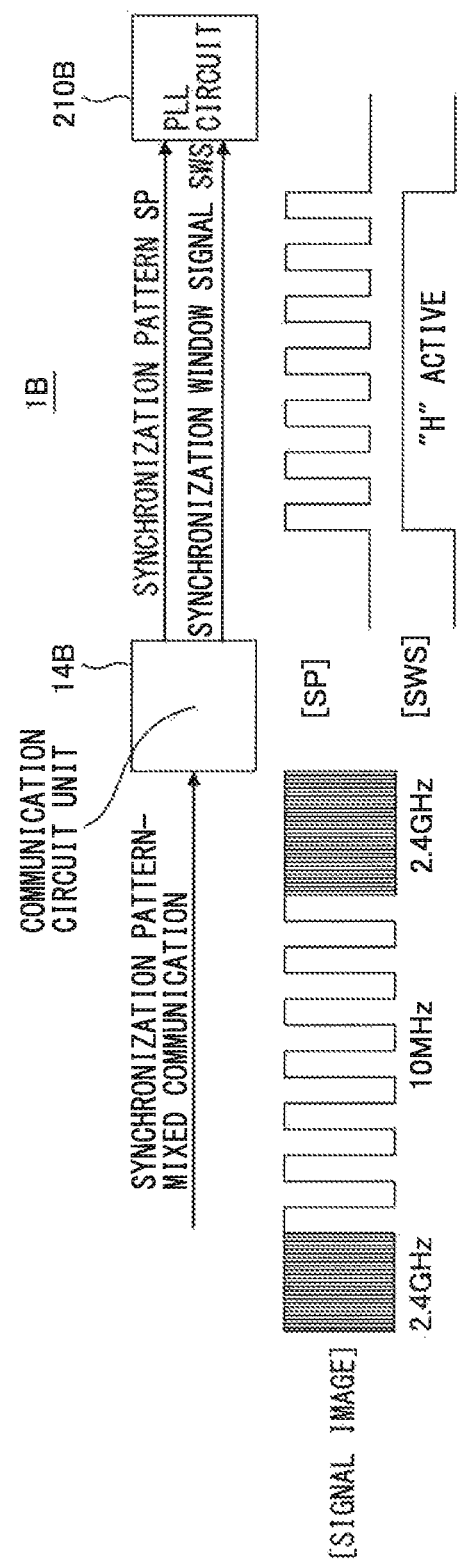

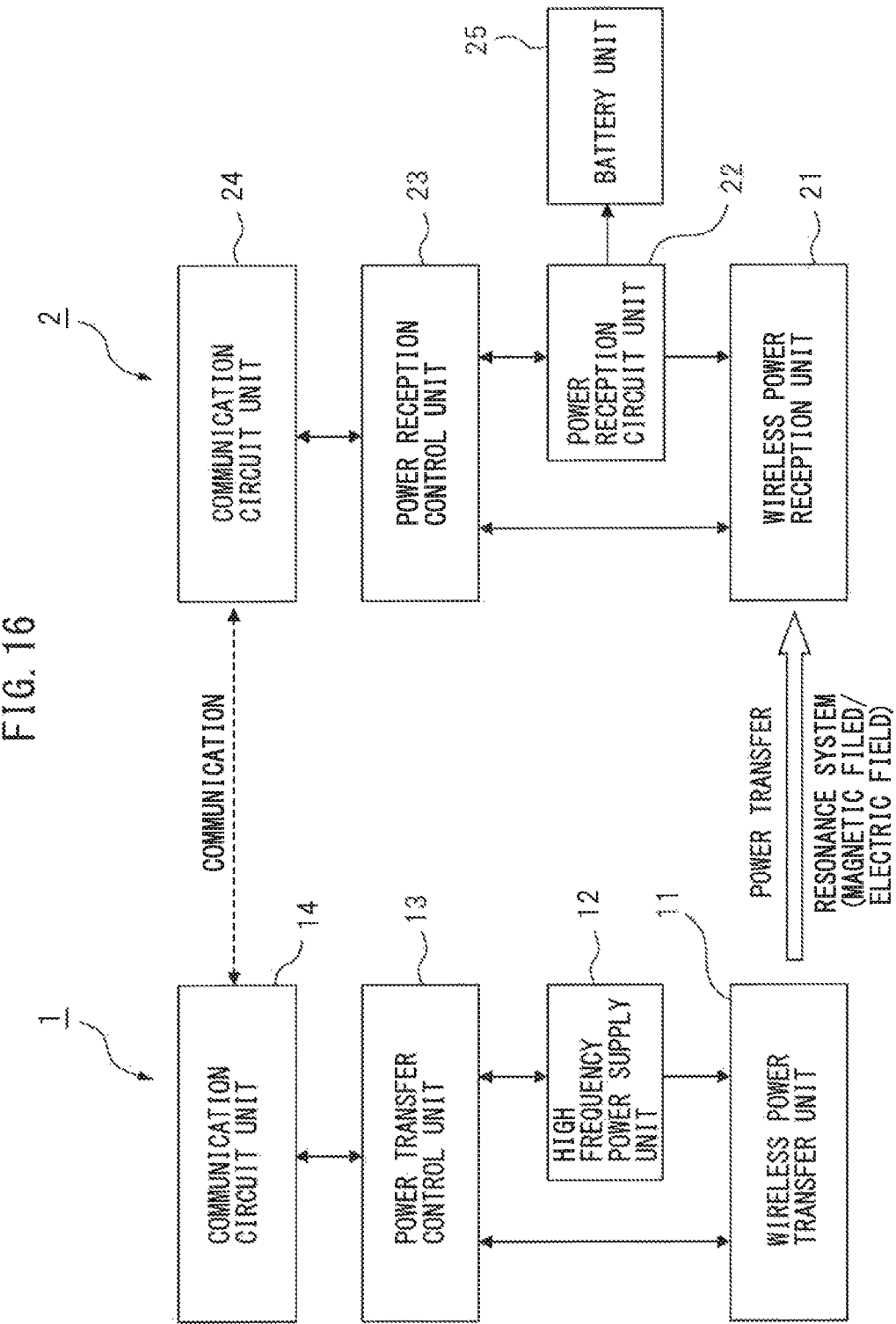

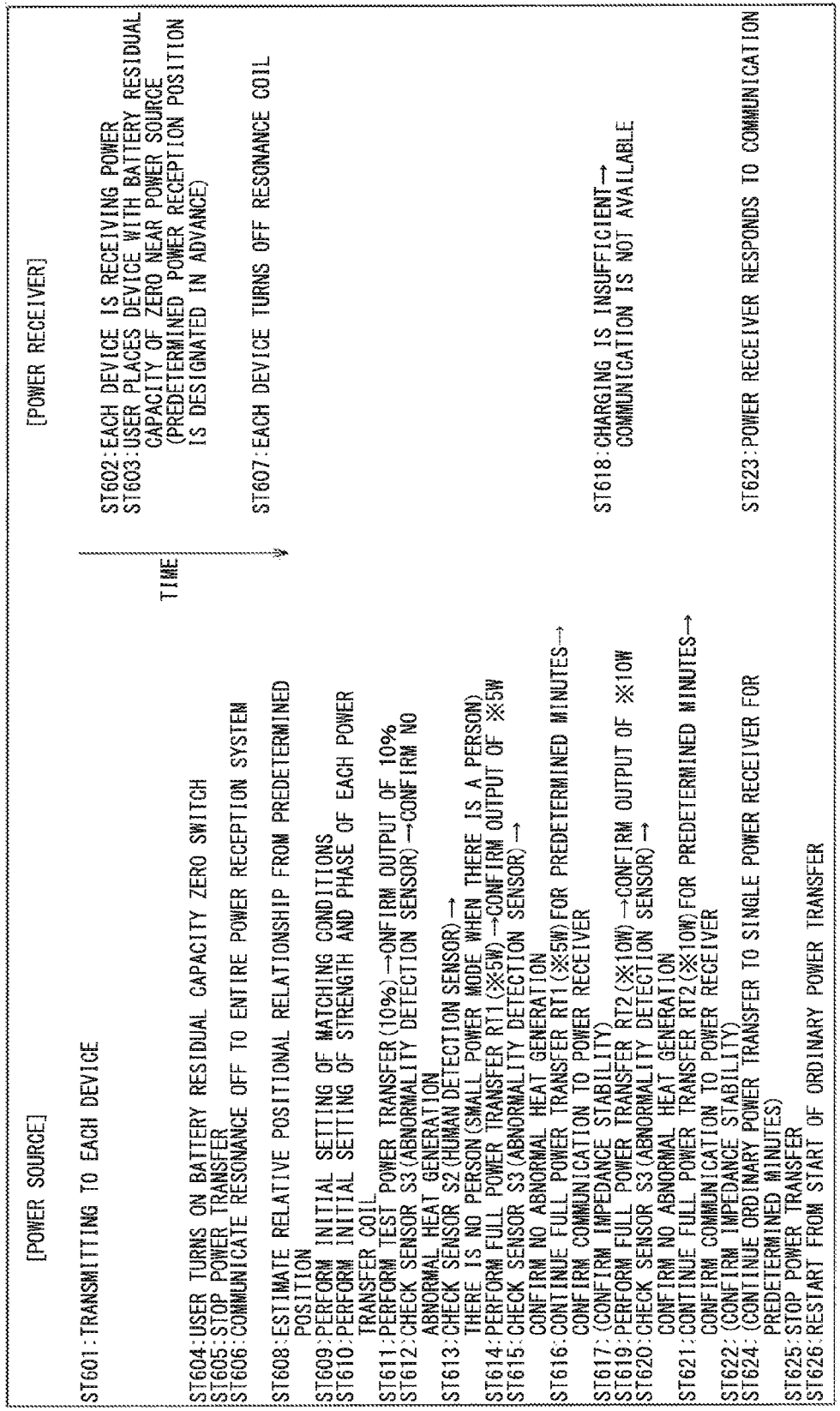

WIRELESS POWER TRANSMISSION SYSTEM AND WIRELESS POWER TRANSMISSION METHOD

CROSS-REFERENCE TO RELATED APPLICATION

This application is a continuation application and is based upon PCT/JP2013/059107, filed on Mar. 27, 2013, which claims the benefit of priority of the prior Japanese Patent Application No. 2012-074001, filed on Mar. 28, 2012, and the prior Japanese Patent Application No. 2012-171261, filed on Aug. 1, 2012, the entire contents of which are incorporated herein by reference.

FIELD

Embodiments discussed herein relate to a wireless power transfer system and a wireless power transfer method.

BACKGROUND

In recent years, wireless power transfer techniques have been gaining attention in order to provide power supply or perform charging. Research and development are being conducted regarding a wireless power transfer system wirelessly performing power transfer to various electronic apparatuses such as mobile terminals and notebook computers and household electrical appliances or to power infrastructure equipment.

In order to use wireless power transfer, it is preferable to standardize so that no problem occurs in the use of a power source of a power source and a power receiver of a power receiver that are of different manufactures.

Among conventional wireless power transfer techniques, a technique using electromagnetic induction and a technique using radio waves have generally been known. On the other hand, expectations for power transfer techniques using magnetic field resonance (magnetic resonance) or electric field resonance have been increasing recently, as techniques allowing for power transfer to a plurality of power receivers and power transfer to various three-dimensional postures while maintaining some distance between power sources and the power receivers. Electric field resonance may also be called electric resonance.

As described above, attention has conventionally been paid to wireless power transfer techniques for wirelessly transferring power for the purposes of power supply or charging. Nevertheless, standardization of power transfer techniques, for example, using magnetic field resonance or electric field resonance has not been made so far.

There has thus been a concern over stagnation of practical application of a power transfer system using magnetic field resonance or electric filed resonance or of a power source and a power receiver.

A variety of wireless power transfer techniques have conventionally been proposed.
Patent document 1: Japanese Laid-open Patent Publication No. 2010-239769
Patent document 2: U.S. Pat. No. 7,825,543
Non-Patent document 1: SHOKI Hiroki, et al., "Standardization Trends on Wireless Power transfer", Technical Report of The Institute of Electronics Information, and Communication Engineers (IEICE technical report), WPT 2011-19, December 2011.

SUMMARY

According to an aspect of the embodiments, there is provided a wireless power transfer system that includes a plurality of power sources and at least one power receiver, power transfer from the power sources to the power receiver being performed in wireless by using magnetic field resonance or electric field resonance.

In the wireless power transfer system, one of the plurality of power sources is designated as a master power source and the other one or more power sources are designated as slave power sources. The master power source controls the plurality of power sources and the at least one power receiver to perform the power transfer.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 2A is a diagram (1) for illustrating a modified example of a transmission coil in the wireless power transfer system of FIG. 1;

FIG. 2C is a diagram (3) for illustrating a modified example of the transmission coil in the wireless power transfer system of FIG. 1;

FIG. 6B is a diagram for illustrating a state of each power receiver in FIG. 6A;

FIG. 6C is a diagram (2) for illustrating correspondence between the plurality of power sources and the plurality of power receivers;

FIG. 6D is a diagram (3) for illustrating correspondence between the plurality of power sources and the plurality of power receivers;

FIG. 6F is a diagram (5) for illustrating correspondence between the and a plurality of power sources and the plurality of power receivers;

FIG. 10 is a diagram for illustrating a status of each power receiver in FIG. 9;

FIG. 15A is a diagram (1) for illustrating a synchronization pattern-mixed communication applied to the second synchronization method illustrated with reference to FIG. 14A to FIG. 14C;

FIG. 15B is a diagram (2) for illustrating the synchronization pattern-mixed communication applied to the second synchronization method illustrated with reference to FIG. 14A to FIG. 14C;

FIG. 16 is a block diagram depicting one example of the wireless power transfer system of the embodiment;

FIG. 24 is a flowchart for illustrating a fifth example of processing in the wireless power transfer system of the embodiment.

DESCRIPTION OF EMBODIMENTS

Figure 1:
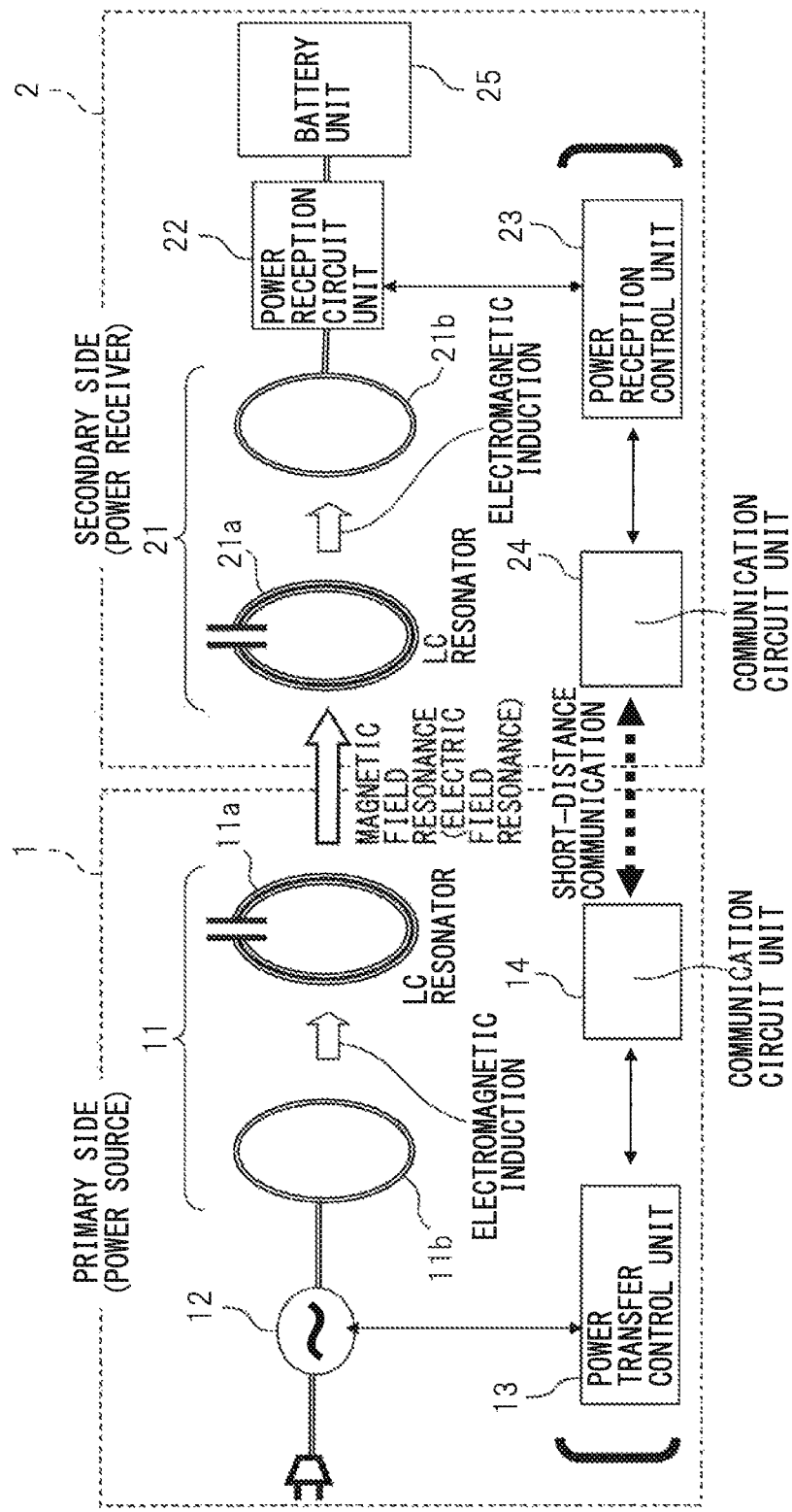
FIG. 1 is a block diagram schematically depicting one example of a wireless power transfer system according to an embodiment of the present invention.

Hereinafter, a detailed description will be given of embodiments of a wireless power transfer system and a wireless power transfer method with reference to the attached drawings. FIG. 1 is a block diagram schematically depicting one example of a wireless power transfer system according to an embodiment of the present invention.

In FIG. 1, reference sign 1 denotes a primary side (a power source: power source), and reference sign 2 denotes a secondary side (a power receiver: power receiver). As depicted in FIG. 1, the primary side 1 includes a wireless power transfer unit 11, a high frequency power supply unit 12, a power transfer control unit 13, and a communication circuit unit (a first communication circuit unit) 14. In addition, the secondary side 2 includes a wireless power reception unit 21, a power reception circuit unit 22, a power reception control unit 23, and a communication circuit unit (a second communication circuit unit) 24.

The wireless power transfer unit 11 includes a first coil (a power supply coil) 11b and a second coil (an LC resonator) 11a, and the wireless power reception unit 21 includes a third coil (an LC resonator) 21a and a fourth coil (a power extraction coil) 21b.

As depicted in FIG. 1, the primary side 1 and the secondary side 2 perform energy (electric power) transmission from the primary side 1 to the secondary side 2 by magnetic field resonance (electric field resonance) between the LC resonator 11a and the LC resonator 21a. Power transfer from the LC resonator 11a to the LC resonator 21a can be performed not only by magnetic field resonance but also electric field resonance or the like. However, the following description will be given mainly by way of example of magnetic field resonance.

The primary side and the secondary side communicate with each other (near field communication) by the communication circuit unit 14 and the communication circuit unit 24. A distance of power transfer (a power transfer range PR) by the LC resonator 11a of the primary side and the LC resonator 21a of the secondary side is set to be shorter than a distance of communication (a communication range CR) by the communication circuit unit 14 of the primary side 1 and the communication circuit unit 24 of the secondary side 2 (PR<CR).

In addition, power transfer by the LC resonators 11a and 21a is performed by a system (an out-band communication) independent from communication by the communication circuit units 14 and 24. Specifically, power transfer by the LC resonators 11a and 21a uses, for example, a frequency band of 6.78 MHz, whereas communication by the communication circuit units 14 and 24 uses, for example, a frequency band of 2.4 GHz. The communication by the communication circuit units 14 and 24 can use, for example, a DSSS wireless LAN system based on IEEE 802.11b or Bluetooth (registered trademark).

The wireless power transfer system of the present embodiment performs power transfer using magnetic field resonance or electric field resonance by the resonator 11a of the power source 1 and the LC resonator 21a of the power receiver 2, for example, in a near field at a distance of about a wavelength of a frequency used. Accordingly, the range of power transfer (a power transfer area) PR varies with the frequency used for power transfer.

The high frequency power supply unit 12 supplies power to the power supply coil (the first coil) 11b, and the power supply coil 11b supplies power to the LC resonator 11a arranged very close to the power supply coil 11b by using electromagnetic induction. The LC resonator 11a transfers power to the LC resonator 21a (the secondary side 2) at a resonance frequency that causes magnetic field resonance between the LC resonators 11a and 21a.

The LC resonator 21a supplies power to the power extraction coil (the fourth coil) 21b arranged very close to the LC resonator 21a, by using electromagnetic induction. The power extraction coil 21b is connected to the power reception circuit unit 22 to extract a predetermined amount of power. The power extracted from the power reception circuit unit 22 is used, for example, for charging a battery in the battery unit 25, as a power supply output to the circuits of the secondary side 2, or the like.

The high frequency power supply unit 12 of the primary side 1 is controlled by the power transfer control unit 13, and the power reception circuit unit 22 of the secondary side 2 is controlled by the power reception control unit 23. Then, the power transfer control unit 13 and the power reception control unit 23 are connected through the communication circuit units 14 and 24 and adapted to perform various controls so that power transfer from the primary side 1 to the secondary side 2 can be performed in an optimum state.

Figure 2B:
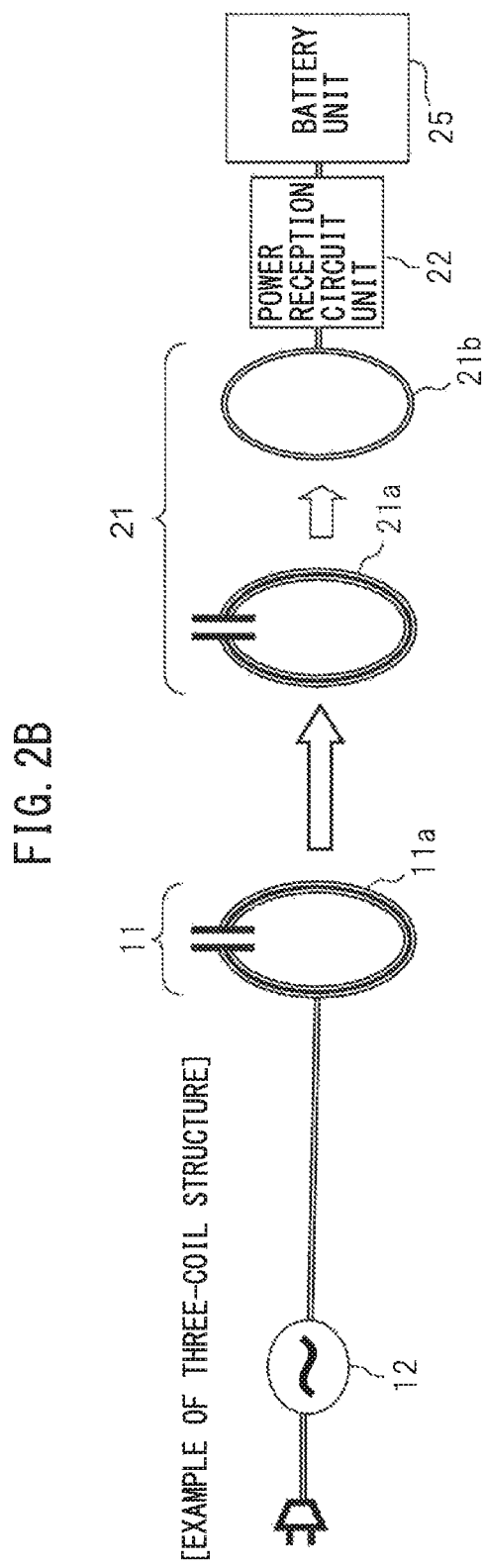
FIG. 2B is a diagram (2) for illustrating a modified example of the transmission coil in the wireless power transfer system of FIG. 1.

FIG. 2A to FIG. 2C are diagrams for illustrating modified examples of a transmission coil in the wireless power transfer system of FIG. 1. FIG. 2A and FIG. 2B depict exemplary three-coil structures, and FIG. 2C depicts an exemplary two-coil structure.

In other words, in the wireless power transfer system depicted in FIG. 1, the wireless power transfer unit 11 includes the first coil 11b and the second coil 11a, and the wireless power reception unit 21 includes the third coil 21a and the fourth coil.

On the other hand, in the example of FIG. 2A, the wireless power reception unit 21 is set as a single coil (an LC resonator) 21a, and in the example of FIG. 2B, the wireless power transfer unit 11 is set as a single coil (an LC resonator) 11a.

Further, in the example of FIG. 2C, the wireless power reception unit 21 is set as a single LC resonator 21a and the wireless power transfer unit 11 is set as a single LC resonator 11a. FIG. 2A to FIG. 2C are merely examples and, obviously, various modifications can be made.

FIG. 3A to FIG. 3D are circuit diagrams depicting examples of an independent resonance coil (the LC resonator 21a), and FIG. 4A to FIG. 4D are circuit diagrams depicting examples of a resonance coil (the LC resonator 21a) connected to a load or a power supply. FIG. 3A to FIG. 3D correspond to the LC resonator 21a of FIG. 1 and FIG. 2B, and FIG. 4A to FIG. 4D correspond to the LC resonator 21a of FIG. 2B and FIG. 2C.

Figure 3A:
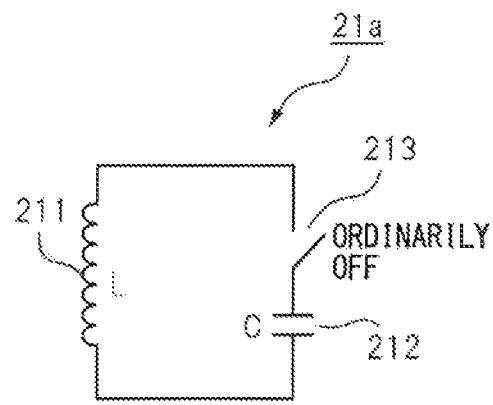
FIG. 3A is a circuit diagram (1) depicting an example of an independent resonance coil.
Figure 3B:
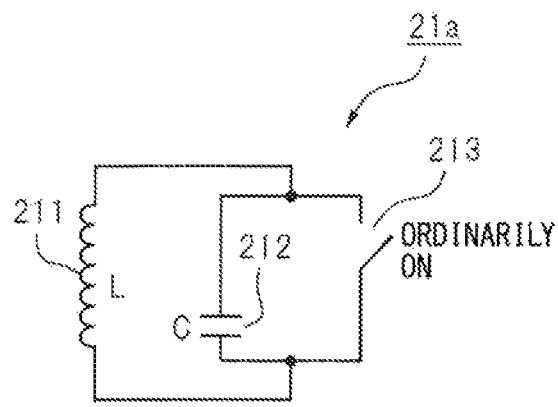
FIG. 3B is a circuit diagram (2) depicting an example of the independent resonance coil.
Figure 4A:
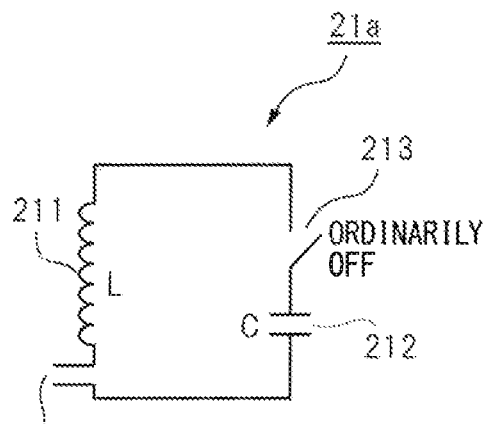
FIG. 4A is a circuit diagram (1) depicting an example of a resonance coil connected to a load or a power supply.

In the examples depicted in FIG. 3A and FIG. 4A, the LC resonator 21a includes a coil (L) 211, a capacitor (C) 212, and a switch 213 connected in series, in which the switch 213 is ordinarily in an off-state. In the examples depicted in FIG. 3B and FIG. 4B, the LC resonator 21a includes the coil (L) 211 and the capacitor (C) 212 connected in series, and the switch 213 connected in parallel to the capacitor 212, in which the switch 213 is ordinarily in an on-state.

Figure 3C:
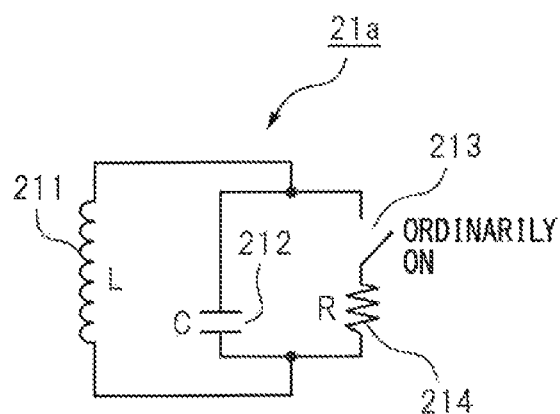
FIG. 3C is a circuit diagram (3) depicting an example of the independent resonance coil.
Figure 4B:
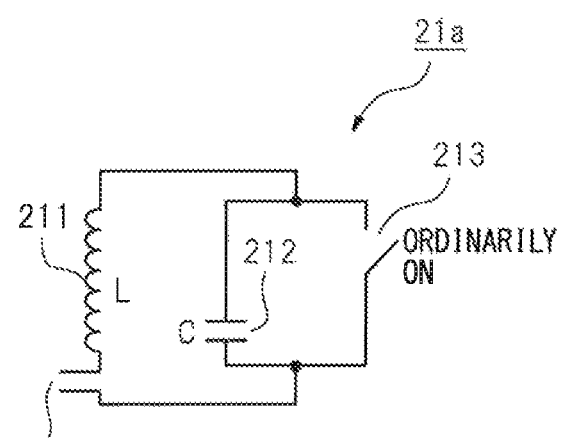
FIG. 4B is a circuit diagram (2) depicting an example of the resonance coil connected to the load or the power supply.
Figure 4C:
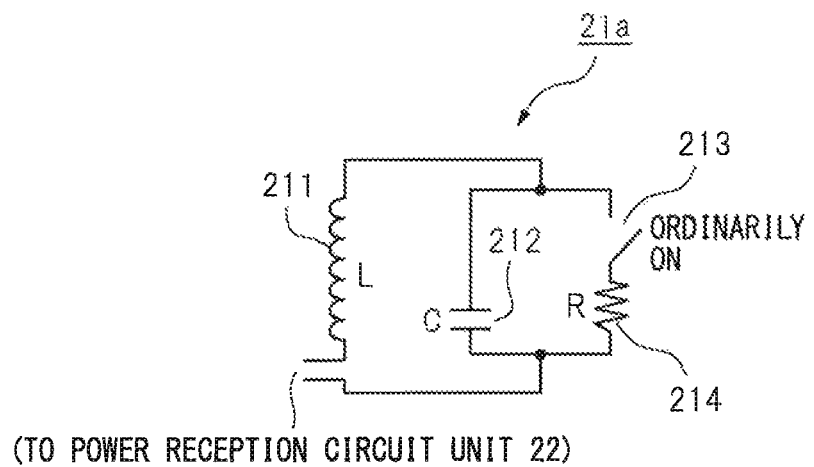
FIG. 4C is a circuit diagram (3) depicting an example of the resonance coil connected to the load or the power supply.

In the examples depicted in FIG. 3C and FIG. 4C, the LC resonator 21a of FIG. 3B and FIG. 4B includes the switch 213 and the resistance (R) 214 connected in series and arranged in parallel to the capacitor 212, in which the switch 213 is ordinarily in the on-state.

Figure 3D:
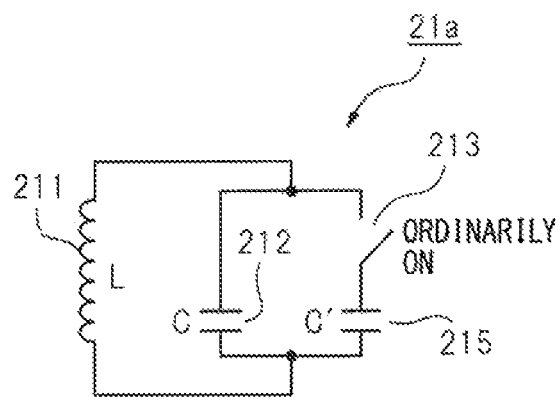
FIG. 3D is a circuit diagram (4) depicting an example of the independent resonance coil.
Figure 4D:
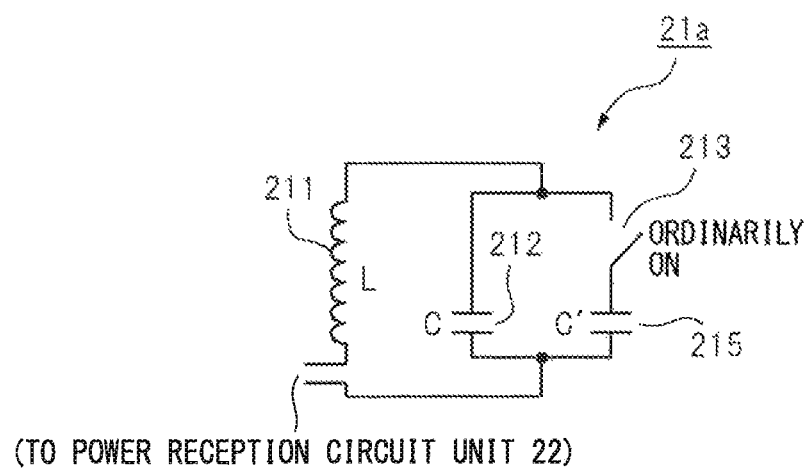
FIG. 4D is a circuit diagram (4) depicting an example of the resonance coil connected to the load or the power supply.

The examples of FIG. 3D and FIG. 4D depict the LC resonator 21a of FIG. 3B and FIG. 4B, in which the switch 213 and another capacitor (C') 215 connected in series are arranged in parallel to the capacitor 212, and the switch 213 is ordinarily in the on-state.

In each of the LC resonators 21a described above, the switch 213 is set to "off" or "on" so that the LC resonator 21a does not operate ordinarily. The reason for this is, for example, to prevent heat generation or the like caused by power transfer to a power receiver not in use (on the secondary side) 2 or to a power receiver 2 out of order.

In the above structure, the LC resonator 11a of the primary side (power source) 1 can also be set as in FIG. 3A and FIG. 3D and FIG. 4A to FIG. 4D. However, the LC resonator 11a of the power source 1 may be set so as to operate ordinarily and may be controlled to be turned on/off by an output of the high frequency power supply unit 12. In this case, in the LC resonator 11a, the switch 213 is to be short-circuited in FIG. 3A and FIG. 4A.

In this manner, when a plurality of power receivers 2 are present, selecting only the LC resonator 21a of a predetermined power receiver 2 for receiving power transmitted from the power source 1 and making the LC resonator 21a operable enables power to be transferred to the selected power receiver 2.

Figure 5A:
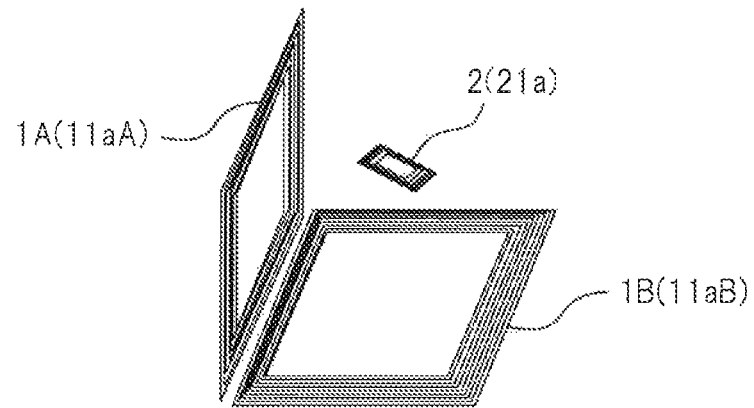
FIG. 5A is a diagram (1) for illustrating an example of controlling a magnetic field by a plurality of power sources.
Figure 5B:
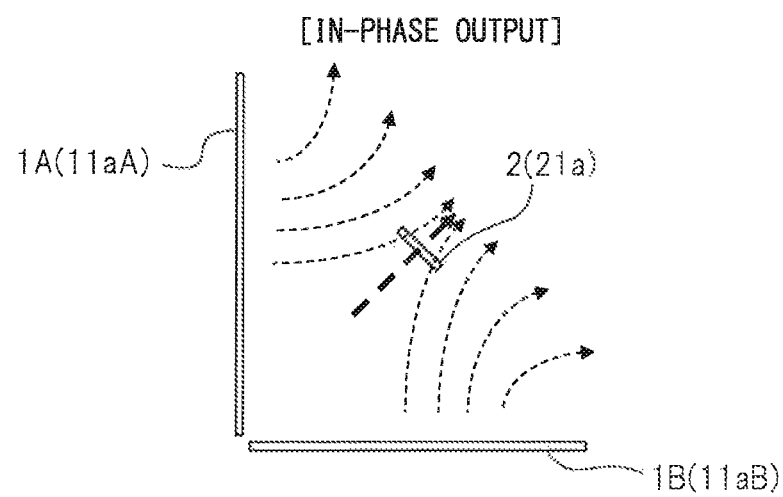
FIG. 5B is a diagram (2) for illustrating an example of controlling a magnetic field by the plurality of power sources.
Figure 5C:
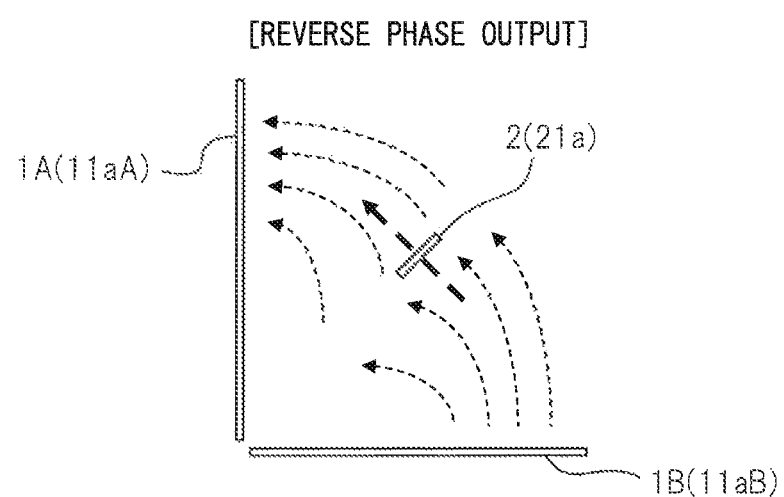
FIG. 5C is a diagram (3) for illustrating an example of controlling a magnetic field by the plurality of power sources.

FIG. 5A to FIG. 5C are diagrams for illustrating examples of controlling a magnetic field by a plurality of power sources. In FIG. 5A to FIG. 5C, reference signs 1A and 1B denote power sources, and reference sign 2 denotes a power receiver. As depicted in FIG. 5A, an LC resonance coil 11aA for power transfer used for magnetic field resonance of the power source 1A and an LC resonance coil 11aB for power transfer used for magnetic field resonance of the power source 1B are arranged, for example, so as to be orthogonal to each other.

Additionally, the LC resonance coil 21a used for magnetic field resonance of the power receiver 2 is arranged at a different angle (an angle not parallel) at a position surrounded by the LC resonance coil 11aA and the LC resonance coil 11aB.

The LC resonance coil 11aA and the LC resonance coil 11aB for power transfer may also be provided in a single power source. In other words, a single power source 1 may include a plurality of wireless power transfer units 11. However, the following description will mainly describe a system in which a single power source 1 includes a single wireless power transfer unit 11 (LC resonance coil 11a).

Although details will be given later, designating one of the plurality of power sources as a master and the other one or more power sources as slaves means that the calculation processing unit (CPU) of the single master power source controls all the LC resonators included in the master power source and the slave power sources.

FIG. 5B depicts a situation in which the resonance coil 11aA and the resonance coil 11aB output an in-phase magnetic field, and FIG. 5C depicts a situation in which the resonance coil 11aA and the resonance coil 11aB output a reverse phase magnetic field.

As can be seen above, when power is transferred to the power receiver 2 positioned at an arbitrary position and an arbitrary posture (angle) by the plurality of power sources 1A and 1B, magnetic fields occurring in the resonance coils 11aA and 11aB of the power sources 1A and 1B change variously.

In other words, the wireless power transfer system of the present embodiment includes a plurality of power sources and at least one power receiver and adjusts outputs (strengths and phases) between the plurality of power sources according to positions (X, Y, and Z) and postures (θx, θy, and θz) of the power receiver.

Figure 6A:
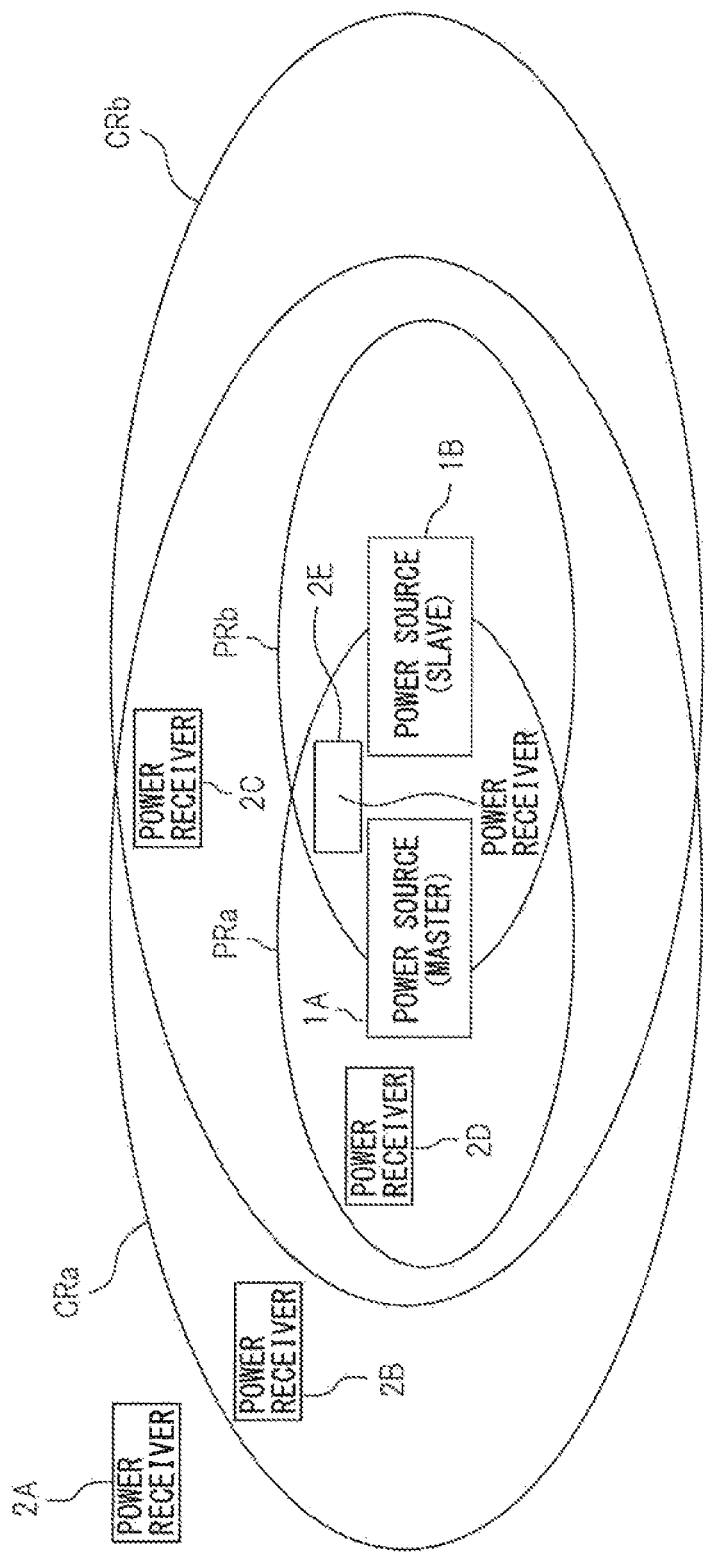
FIG. 6A is a diagram (1) for illustrating correspondence between a plurality of power sources and a plurality of power receivers.

FIG. 6A is a diagram (1) for illustrating correspondence between a plurality of power sources and a plurality of power receivers, and FIG. 6B is a diagram for illustrating a status of each of the power receivers in FIG. 6A, in which two power sources 1A and 1B and five power receivers 2A to 2E are arranged.

In the wireless power transfer system of the present embodiment, the single power source 1A of the plurality of power sources 1A and 1B is designated as a master (primary) and the other power source 1B is designated as a slave (secondary). For example, the master (the power source 1A) determines processing such as optimization of the plurality of power sources and the power receiver.

In FIG. 6A, reference sign PRa denotes a power transfer area of the power source 1A (a master power transfer area); reference sign PRb denotes a power transfer area of the power source 1B (a slave power transfer area); reference sign CRa denotes a communication area of the power source 1A (a master communication area); and reference sign CRb denotes a communication area of the power source 1B (a slave communication area).

Accordingly, statuses of the power receivers 2A to 2E are as follows. Specifically, as depicted in FIG. 6B, the power receiver 2A is outside the master communication area CRa (x), outside the slave communication area Crb, outside the master power transfer area PRa, and outside the slave power transfer area PRb, and simply waits for communication from the power sources.

Next, the power receiver 2B is located within the master communication area CRa (o), outside the slave communication area CRb, outside the master power transfer area PRa, and outside the slave power transfer area PRb. Thus, communicating with the master power source 1A allows for a confirmation that the power receiver 2B is outside the power areas (outside the master and slave power transfer areas).

In addition, the power receiver 2C is within the master communication area CRa, within the slave communication area CRb, outside the master power transfer area PRa, and outside the slave power transfer area PRb. Thus, communicating with the master and slave power sources 1A and 1B allows for a confirmation that the power receiver 2C is outside the power areas.

In addition, the power receiver 2D is within the master communication area CRa, within the slave communication area CRb, within the master power transfer area PRa, and outside the slave power transfer area PRb. Thus, communicating with the master and slave power sources 1A and 1B allows for a confirmation that the power receiver 2D is within the power area of the power source 1A (within the master power transfer area PRa).

Additionally, the power receiver 2E is within the master communication area CRa, within the slave communication area CRb, within the master power transfer area PRa, and within the slave power transfer area PRb. Thus, communicating with the master and slave power sources 1A and 1B allows for a confirmation that the power receiver 2E is within the power areas of the power sources 1A and 1B (within the power transfer areas PRa and PRb).

Of the plurality of power sources, a single power source is determined as a master. The master may be determined, for example, depending on a condition in which a largest number of power receivers are located within the communication area of the power source or within the power transfer area thereof, as described later.

For example, when there is an equal condition in which each one power receiver is located within the communication areas of the power sources, the master may be determined by adding an additional condition such as a communication strength between the power source and the power receiver, or an arbitrary one power source may be determined as a master using a random number table or the like.

When the power sources are of different manufacturers, optimization rules for strengths and phases of the power sources differ from each other. Thus, in the wireless power transfer system of the embodiment, designating one of the plurality of power sources as a master allows the master power source to control optimization for the power sources including the other one or more slave power sources.

Figure 6E:
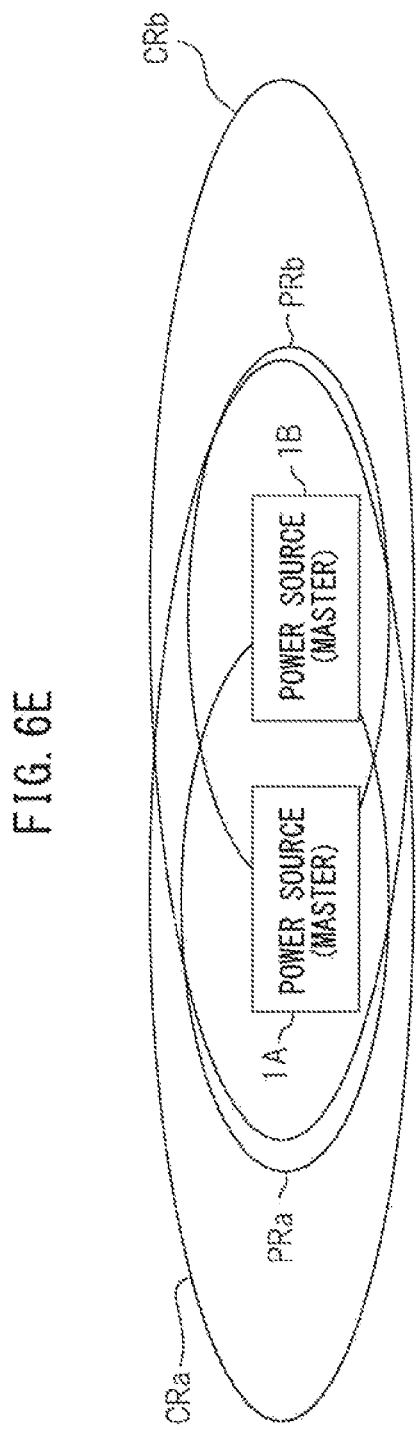
FIG. 6E is a diagram (4) for illustrating correspondence between the plurality of power sources and the plurality of power receivers.

FIG. 6C to FIG. 6E are diagrams (2 to 4) for illustrating correspondence between the plurality of power sources and the plurality of power receivers, and illustrating how to determine a master and slaves in the plurality of power sources.

First, a master power source and slave power sources are determined in the plurality of power sources when the power sources are located within communication ranges (communication areas) of each other, power transfer ranges (power transfer areas) of the power sources overlap each other, and the relevant power receiver detects the overlapping of the power transfer areas.

Specifically, FIG. 6C depicts a situation in which the communication area CRa of the power source 1A overlaps the communication area CRb of the power source 1B, whereas the power transfer area PRa of the power source 1A does not overlap the power transfer area PRb of the power source 1B. In this situation, since the power transfer areas PRa and PRb do not overlap each other, both the power sources 1A and 1B are designated as respective master power sources.

Next, FIG. 6D depicts a situation in which the communication area CRa and the power transfer area PRa of the power source 1A overlap the communication area CRb and the power transfer area PRb of the power source 1B and the power receiver 2 is included in both the power transfer areas PRa and PRb.

In the situation of FIG. 6D, the power sources 1A and 1B are located within the communication areas CRa and CRb of each other, the power transfer areas PRa and PRb overlap each other, and moreover, the power receiver 2 detects the overlapping of the power transfer areas PRa and PRb.

Accordingly, in FIG. 6O, one (1A) of the power sources 1A and 1B is designated as a master power source and the other one (1B) thereof is designated as a slave power source. In this case, although the power source 1B may be designated as a master and the power source 1A may be designated as a slave, either one of the power sources 1A and 1B is designated as a master power source.

In addition, FIG. 6E depicts a situation in which the power sources 1A and 1B are arranged in the same positional relationship as that in FIG. 6D described above, but the power receiver 2 is not present (not located within the communication areas CRa and CRb). In this situation, both the power sources 1A and 1B are designated as masters.

Similarly, when three or more power sources are arranged, for example, in the positional relationship corresponding to FIG. 6D, any one of the power sources is designated as a master power source. Various methods can be considered to designate a single master power source from the plurality of power sources. One example of the methods will be described with reference to FIG. 6F.

FIG. 6F is a diagram (5) for illustrating correspondence between the and a plurality of power sources and the plurality of power receivers, in which four power sources 1A to 1D are arranged in a line. A communication area CRa of the power source 1A includes the power source 1B but does not include the power sources 1C and 1D. Similarly, a communication area CRd of the power source 1D includes the power source 1C but does not include the power sources 1A and 1B.

In addition, a communication area CRb of the power source 1B includes the power sources 1A and 1C but does not include the power source 1D. Similarly, a communication area CRc of the power source 1C includes the power sources 1B and 1D but does not include the power source 1A.

In the situation of FIG. 6F, for example, the power source 1B is designated as a mater (a master power source) and the other power sources 1A, 1C, and 1D are designated as slaves (slave power sources). Alternatively, the power source 1C may be designated as a master. Meanwhile, designating the power source 1B as a master power source makes it difficult to directly communicate with the power source 1D. In this case, the power source 1B communicates with the power source 1D via the power source 1C to control optimization and the like.

Thus, in the wireless power transfer system of the present embodiment, it is preferable to designate, as a master, a power source that can directly communicate with a largest number of power sources when designating a single master from a plurality of power sources.

In FIG. 6F, the four power sources 1A to 1D are arranged in a straight line. However, practically, a plurality of power sources will be disposed in various positional relationships, for example, by being embedded in a wall or a ceiling of a room, being built in a desk or a table, or being mounted on a floor, a table, or the like.

Figure 7:
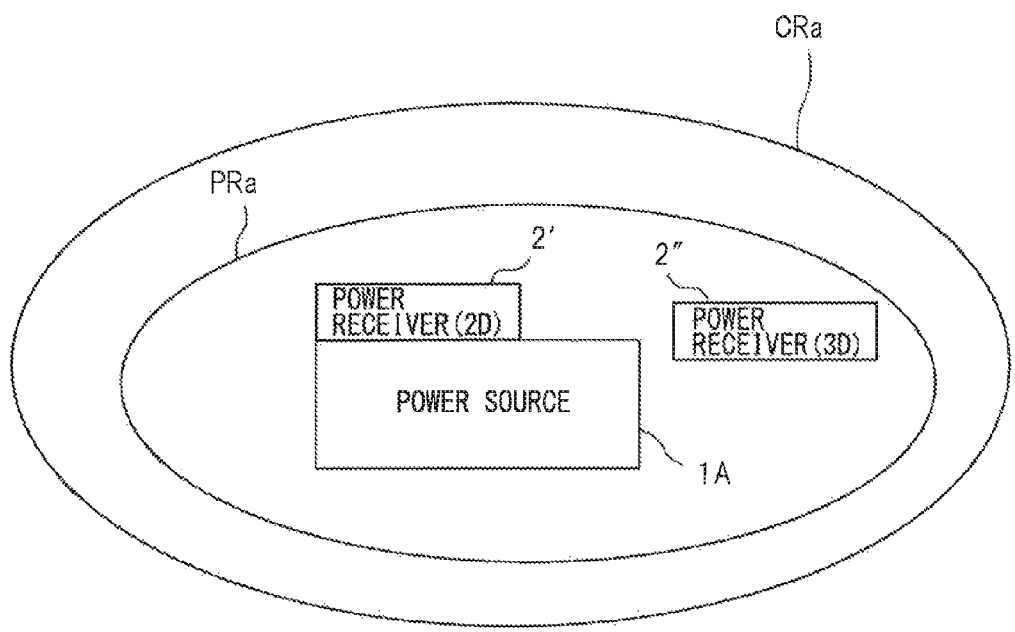
FIG. 7 is a diagram for illustrating posture information of power receivers.

FIG. 7 is a diagram for illustrating posture information of power receivers and depicts a power source 1A as a master and two power receivers 2' and 2". Examples of the power receiver 2 may include a 2-dimensional charge power receiver 2' charged only with two-dimensional positional information (X, Y, Z) and a 3-dimensional charge power receiver 2" charged with three-dimensional position information (X, Y, Z) and posture information ($\theta$x, $\theta$y, $\theta$z).

In other words, the power receiver (2D) 2' is charged, for example, by mounting (horizontally mounting) on an upper surface of the power source, and the power receiver (3D) 2" is charged, for example, even at an arbitrary position and an arbitrary posture with respect to the power source.

Accordingly, even when the wireless power transfer system of the embodiment includes the 2-dimensional charge power receiver 2' and the 3-dimensional charge power receiver 2" together, the system can perform appropriate power transfer processing. The posture information ($\theta$x, $\theta$y, $\theta$z) used for 3-dimensional charging is available, for example, from a three-dimensional acceleration sensor or the like incorporated even in the current power receiver 2", such as a smart phone.

FIG. 8A to FIG. 8D are diagrams (1 to 4) for illustrating distribution control of power to a plurality of power receivers, in which distribution control without resonance adjustment of LC resonators is illustrated. In FIG. 8A to FIG. 8D, for simplifying the illustration, only one power source 1 is depicted, although the same applies also to a plurality of power sources. In addition, efficiency means a power transfer efficiency between the power source 1 (the LC resonator 11a) and the power receiver 2 (the LC resonator 21a).

Figure 8A:
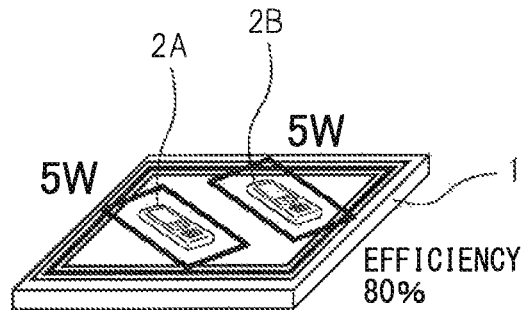
FIG. 8A is a diagram (1) for illustrating distribution control of power to a plurality of power receivers.

First, as depicted in FIG. 8A, when two power receivers 2A and 2B whose received powers are equal (for example, 5 W) are horizontally mounted on the power source 1 to perform 2-dimensional charging, for example, efficiencies with respect to the power receivers 2A and 2B are equal (for example, 80%). Thus, in the situation of FIG. 8A, a simultaneous power transfer mode (simultaneous transmission mode) can be performed in which power transfer to the two power receivers 2A and 2B is simultaneously performed.

Figure 8B:
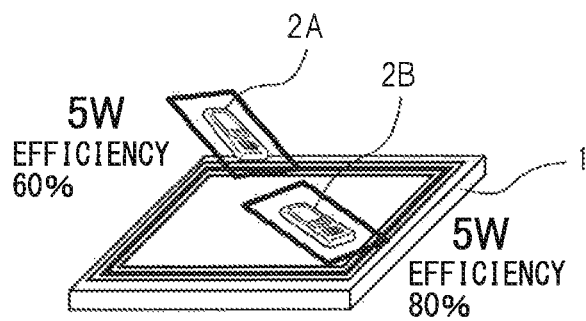
FIG. 8B is a diagram (2) for illustrating distribution control of power to the plurality of power receivers.

Next, as depicted in FIG. 8B, when the two power receivers 2A and 2B whose received powers are equal (5 W) are arranged above the power source 1 to perform 3-dimensional charging, for example, an efficiency with respect to the power receiver 2A is 60% and an efficiency with respect to the power receiver 2B is 80%.

In FIG. 8B, the reason why the efficiencies of the power receivers 2A and 2B are different is that, for example, the power receivers 2A and 2B have different distances (positions) and different postures with respect to the power source 1. Accordingly, in the situation of FIG. 8B, the simultaneous transmission mode is not applicable. Thus, power transfer by a time division power transfer mode (a time division mode) is performed, in which the power receiver 2A and charging to the power receiver 2B are charged by dividing time.

When simultaneous transmission mode is possible (for example, the situation of FIG. 8A), time division mode is obviously possible. In addition, during charging (power transfer) to the power receiver 2A in a time division mode, the LC resonator 21aB of the power receiver 2B is turned off, and conversely, during charging to the power receiver 2B, the LC resonator 21aA of the power receiver 2A is turned off.

Figure 8C:
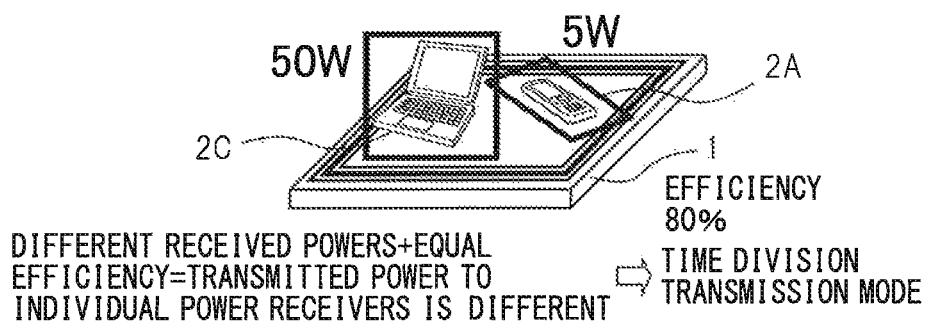
FIG. 8C is a diagram (3) for illustrating distribution control of power to a plurality of power receivers.

Additionally, as depicted in FIG. 8C, when the two power receiver 2A and 2C whose received powers are different are horizontally mounted on the power source 1 to perform 2-dimensional charging, for example, efficiencies with respect to the power receiver 2A and 2B are equal.

However, for example, while the received power of the power receiver 2A such as a smart phone is 5 W, the received power of the power receiver 2C such as a notebook computer is 50 W, so that the received powers are different between the power receivers 2A and 2C. Even in the situation of FIG. 8C, simultaneous transmission mode is not applicable, similarly to FIG. 8B, so that power transfer by a time division mode is performed.

Figure 8D:
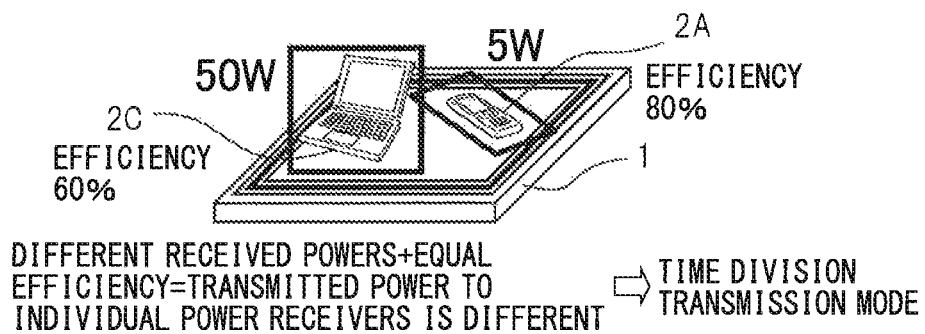
FIG. 8D is a diagram (4) for illustrating distribution control of power to the plurality of power receivers.
Figure 8E:
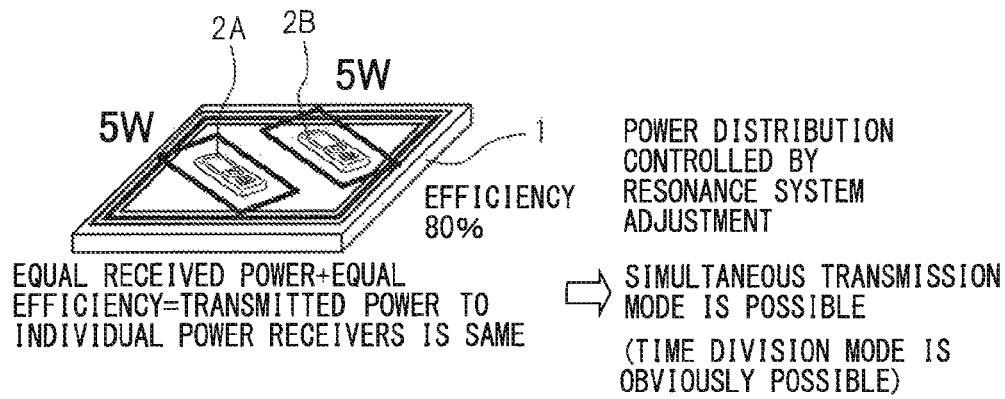
FIG. 8E is a diagram (5) for illustrating distribution control of power to the plurality of power receivers.
Figure 8F:
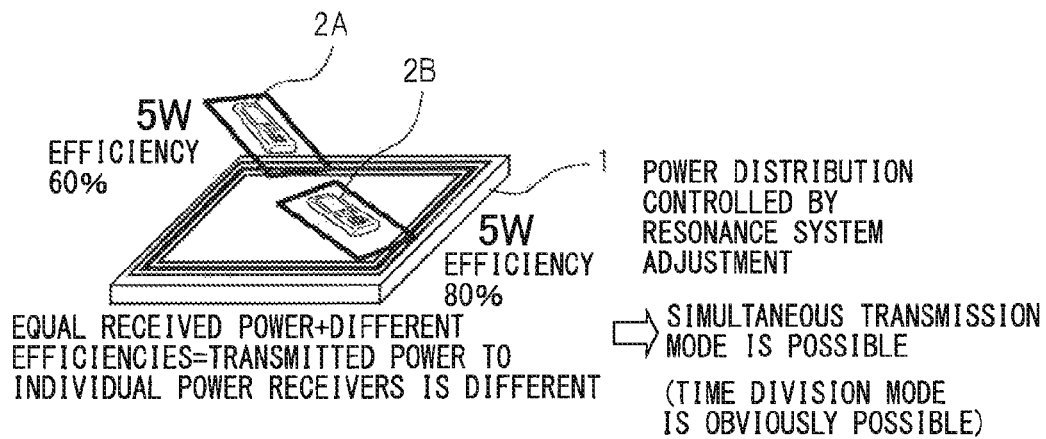
FIG. 8F is a diagram (6) for illustrating distribution control of power to the plurality of power receivers.

Furthermore, as depicted in FIG. 8D, for example, when the power receiver 2A with the received power of 5 W and the power receiver 2C with the received power of 50 W are arranged above the power source 1 to perform 3-dimensional charging, for example, an efficiency with respect to the power receiver 2A is 60% and an efficiency with respect to the power receiver 2C is 80%. Accordingly, even in the situation of FIG. 8C, similarly to FIG. 8B and FIG. 8C, simultaneous transmission mode is not applicable and thus power transfer by a time division mode is performed.

FIG. 8E to FIG. 8H are diagrams (5 to 8) for illustrating distribution control of power to a plurality of power receivers, in which distribution control in resonance adjustment of LC resonators is illustrated. FIG. 8E to FIG. 8H correspond to FIG. 8A to FIG. 8D described above.

First, the power source 1 transmits power to a power receiver having a largest received power between or among the plurality of power receivers (for example, the notebook computer 2C having a received power of 50 W). In this situation, regarding the power receivers whose received powers are not the largest (for example, smart phones 2A and 2B having a received power of 5 W), adjustment of LC resonators 21aA and 21aB is made such that the power receivers 2A and 2B have an optimum received power (5 W).

Specifically, adjustment (resonance adjustment) in the power receivers 2A and 2B whose received powers are not the largest is made by changing resonance frequencies or Q values of the LC resonators 21aA and 21aB thereof so that the values of power received by the LC resonators 21aA and 21aB are suitable to the received powers of the power receivers 2A and 2B.

Performing the resonance adjustment described above allows power transfer to be performed in both of simultaneous transmission mode and time division mode in all the situations of FIG. 8E to FIG. 8H. For example, in the situation of FIG. 8F, shifting a resonance frequency or a Q value of the LC resonator 21aB of the power receiver 2B from an appropriate value allows for simultaneous transmission of power to the power receivers 2A and 2B.

Figure 8G:
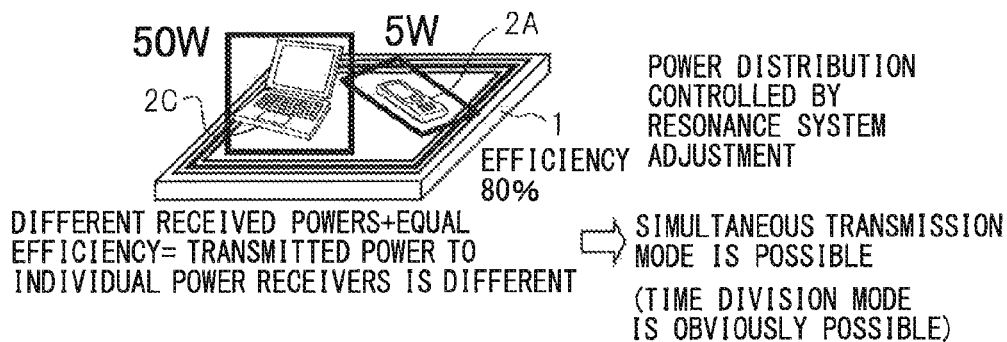
FIG. 8G is a diagram (7) for illustrating distribution control of power to the plurality of power receivers.
Figure 8H:
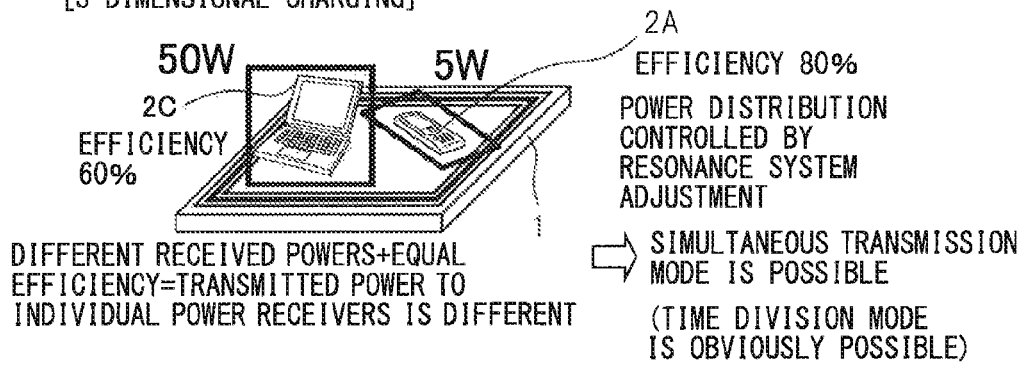
FIG. 8H is a diagram (8) for illustrating distribution control of power to the plurality of power receivers.

In addition, in the situations of FIG. 8G and FIG. 8H, shifting a resonance frequency or a Q value of the LC resonator 21aA of the power receiver 2A from an appropriate value in both situations thereof allows for simultaneous transmission of power to the power receivers 2A and 2C. In addition, an application associated with the resonance adjustment described above has separately been filed by the same applicant as named herein. However, it is obvious that the resonance adjustment of the invention is not limited thereto and other methods are also applicable.

The master power source 1 performs the pieces of processing in FIG. 8A to FIG. 8D and FIG. 8E to FIG. 8H, i.e., control of the strength and phase of power to be transmitted in the power source 1 and controls in the respective power receivers 2A to 2C. In addition, although only the single power source 1 is depicted in FIG. 8A to FIG. 8D and FIG. 8E to FIG. 8H, a single master power source designated from a plurality of power sources usually performs each of the pieces of processing described above.

Figure 9:
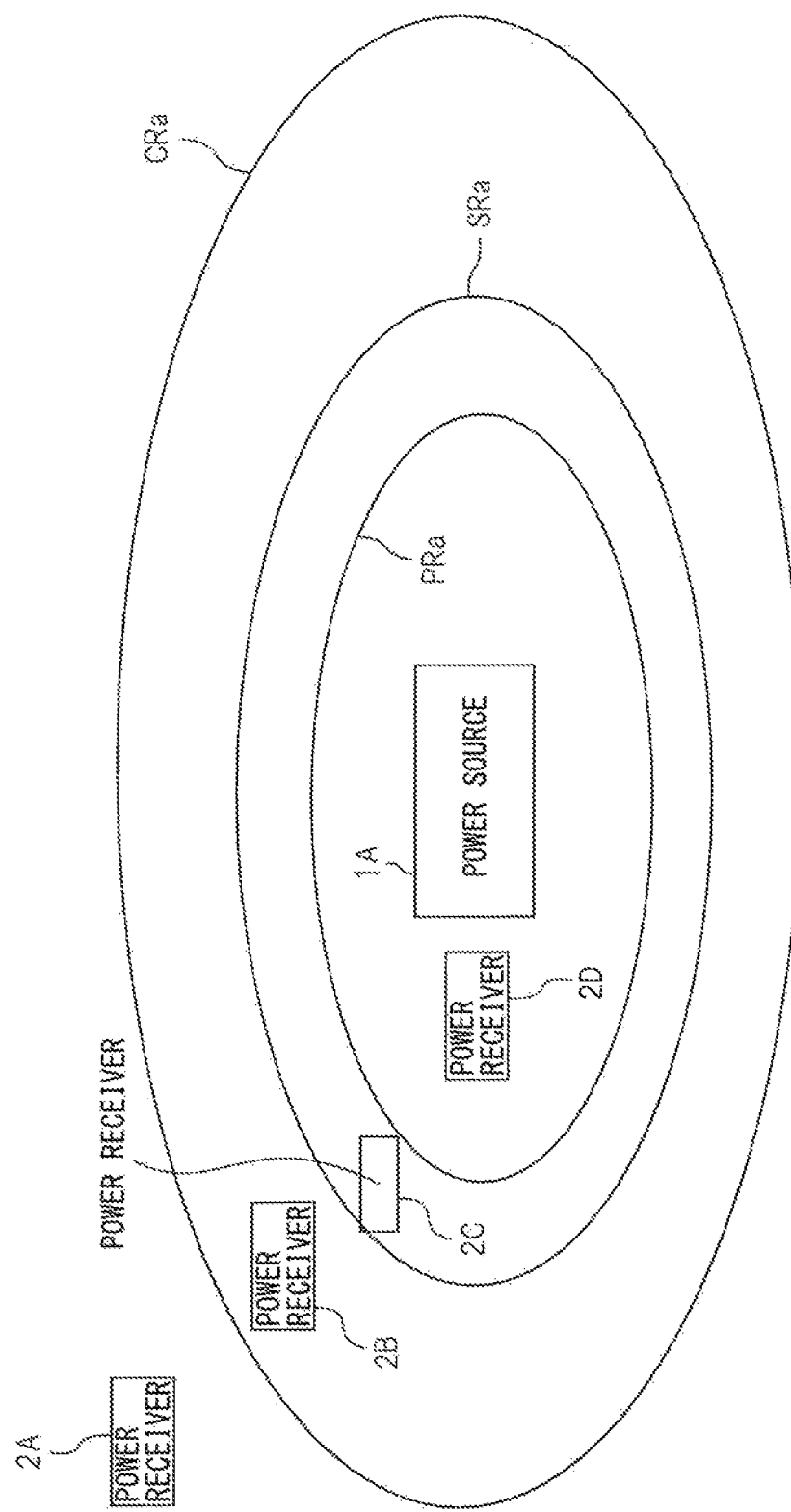
FIG. 9 is a diagram for illustrating human detection and output adjustment for a power source.

FIG. 9 is a diagram for illustrating human detection and output adjustment for a power source, and FIG. 10 is a diagram for illustrating a state of each power receiver in FIG. 9. In FIG. 9, reference sign SRa denotes a detection range (a bio-sensing range: a human detection sensor range or a human detection sensor area) by a human detection sensor (a biodetection sensor (S2)) that detects the presence or absence of a person (a living body) by the power source 1A.

A power transfer area (power transfer range) PRa of the power source 1A has, for example, a radius of from about 2 to about 3 meters. A human detection sensor area SRa thereof is, for example, larger than the power transfer area PRa and has a radius of from about 4 to about 5 m, and a communication area (communication range) CRa thereof has a radius of about 10 m.

In other words, the human detection sensor area SRa is larger than the power transfer area PRa and the communication area CRa is larger than the human detection sensor area SRa, so that a relationship of PRa<SRa<CRa is established. The power transfer area PRa, the human detection sensor area SRa, and the communication area CRa are merely examples, and obviously, various changes can be made depending on specifications of the device.

Accordingly, statuses of the power receivers 2A to 2D are as follows. Specifically, as depicted in FIG. 10, the power receiver 2A is located outside the communication area CRa of the power source 1A (x), outside the human detection sensor area SRa thereof, and outside the power transfer area PRa thereof, and thus simply waits for communication from the power source.

Next, the power receiver 2B is located within the communication area CRa (o), outside the human detection sensor area SRa, and outside the power transfer area PRa, so that communicating with the power source 1A allows for a confirmation that the power receiver 2B is outside the power area PRa.

Additionally, the power receiver 2C is located within the communication area CRa, within the human detection sensor area SRa, and outside the power transfer area PRa, so that communicating with the power source 1A allows for a confirmation that the power receiver 2C is outside the power area PRa.

Additionally, the power receiver 2D is located within the communication area CRa, within the human detection sensor area SRa, and within the power transfer area PRa, so that communicating with the power source 1A allows for a confirmation that the power receiver 2D is within the power area PRa, and confirmation by the human detection sensor can also be made.

A description will be given of an example of controlling output of the power source 1A using a human detection sensor. For example, when no person (no living body) is present in the human detection sensor area SRa, a power transfer output from the power source 1A is set to, for example, 50 W. Conversely, when a person is present in the human detection sensor area SRa, the power transfer output from the power source 1A is reduced to, for example, 5 W.

Figure 11:
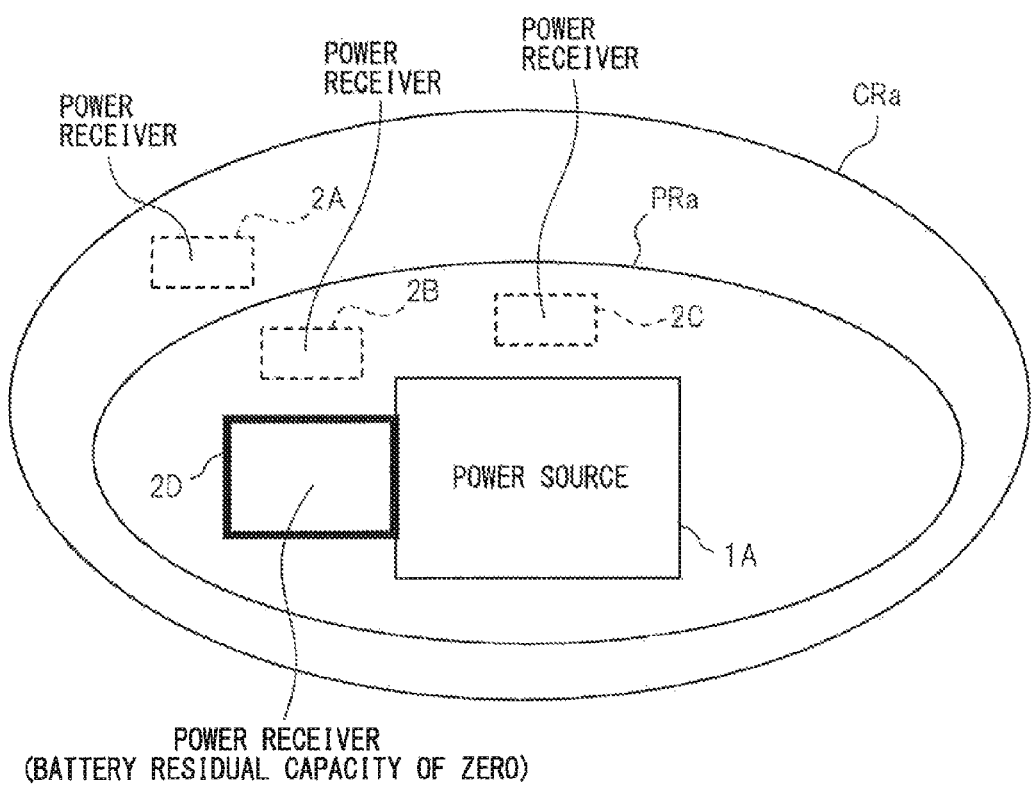
FIG. 11 is a diagram for illustrating measures for a power receiver with a battery residual capacity of zero.

FIG. 11 is a diagram for illustrating measures for a power receiver with a battery residual capacity of zero. First, in order to obtain necessary power information of a power receiver, communication between a power source and a power receiver is essential. However, for example, communication is impossible when the battery residual capacity of the power receiver is zero.

Then, instead of performing power transfer (power reception) to the power receiver 2D (2) with the battery residual capacity of zero by using the wireless power reception unit 21 (LC resonator 21a), for example, the power receiver 2D (2) may be charged by electromagnetic induction using the power extraction coil 21b while keeping the LC resonator 21a in an off state. This is effective when the wireless power reception unit 21 of the power receiver 2 includes the LC resonator 21a and the power extraction coil 21b, i.e., in the situations of FIG. 1 and FIG. 2B.

Alternatively, it is also possible to charge by electromagnetic induction using the LC resonator 21a being in the off state. In this case, the LC resonator 21a of FIG. 4A and the LC resonator 21a of FIG. 4C, which are open in the off state, will be excluded.

The reason for excluding the LC resonator 21a of FIG. 4C is that a resistance 214 has a resistance value significantly larger than a connection resistance of the power reception circuit unit 22 and thus received power is consumed by the resistance 214.

FIG. 11 depicts a situation in which the power source (master power source) 1A is performing power transfer to the plurality of power receivers 2B and 2C, in which the power receiver 2D with the battery residual capacity of zero is arranged in contact with a predetermined position of the power source 1A and a battery residual capacity zero mode of the power source 1A is designated.

In the designation of the battery residual capacity zero mode in the power source 1A, for example, when a battery residual capacity zero switch arranged on the power source 1A is turned on, the power source 1A stops power transfer (power transfer) to the power receivers 2B and 2C.

Furthermore, the power source 1A turns off resonance of the LC resonators 21a (21aA to 21aC) of the power receivers 2A to 2C located within the communicable communication area CRa. Power transfer to the power receiver 2A is originally not performed and the LC resonator 21aA is already off.

This allows power transfer using electromagnetic induction (coupling) to be performed only for the power receiver 2D with the battery residual capacity of zero but not to be performed for the other power receivers 2A to 2C.

Then, in the power receiver 2D with the battery residual capacity of zero, battery charging is done by, for example, power transfer using electromagnetic induction and then the charging is continued until communication between the power source 1A and the power receiver 2D becomes possible.

Charging processing for the power receiver 2D with the battery residual capacity of zero by the power source 1A may be controlled so as to be performed until communication with the power receiver 2D is recovered by gradually increasing power, for example, like test power transfer→small power transfer→medium power transfer. In addition, power transfer using ordinary magnetic field resonance is performed after the communication between the power source 1A and the power receiver 2D has become possible. Obviously, power transfer using electromagnetic induction may be performed until the battery of the power receiver 2D is sufficiently charged.

Figure 12A:
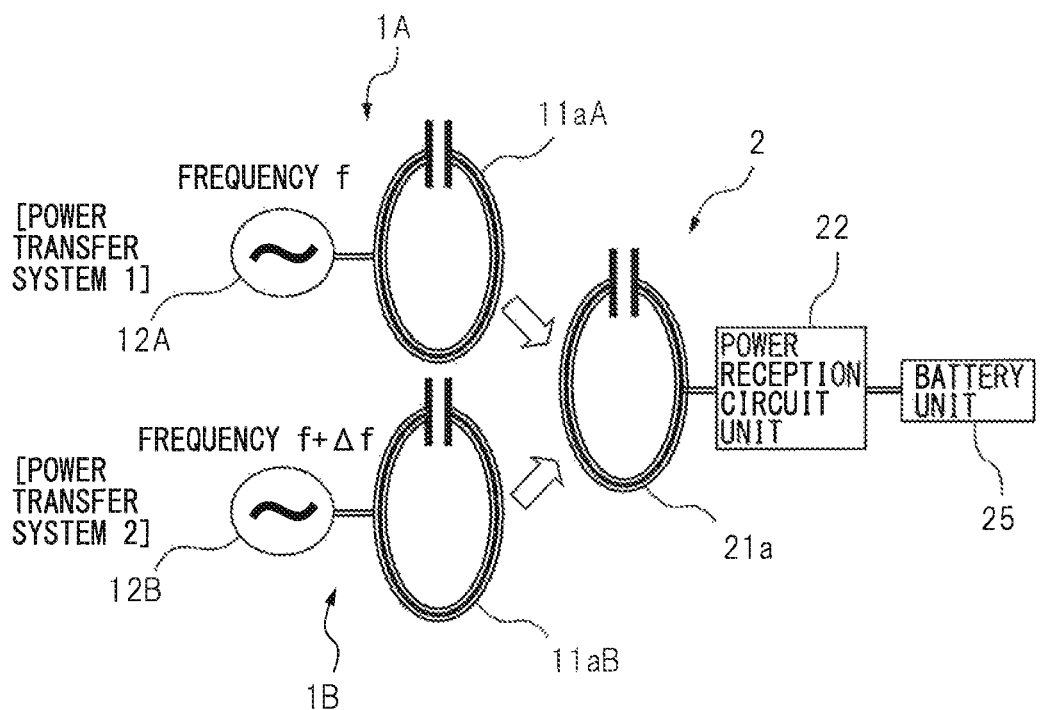
FIG. 12A is a diagram (1) for illustrating a synchronization problem in a plurality of power sources.
Figure 12B:
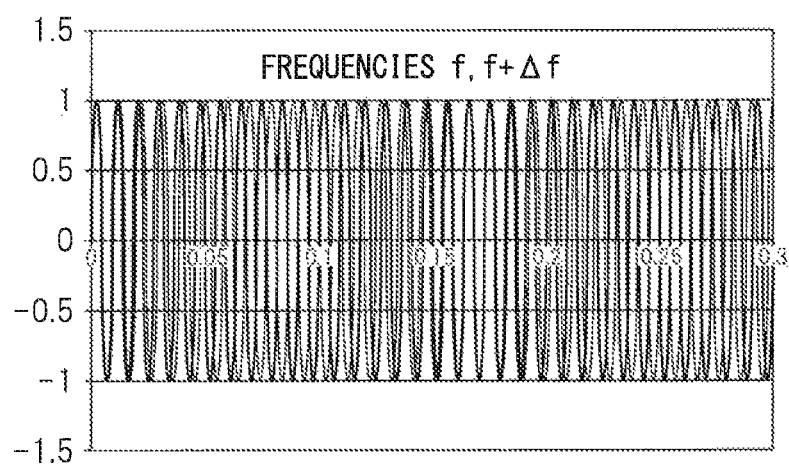
FIG. 12B is a diagram (2) for illustrating the synchronization problem in the plurality of power sources.
Figure 12C:
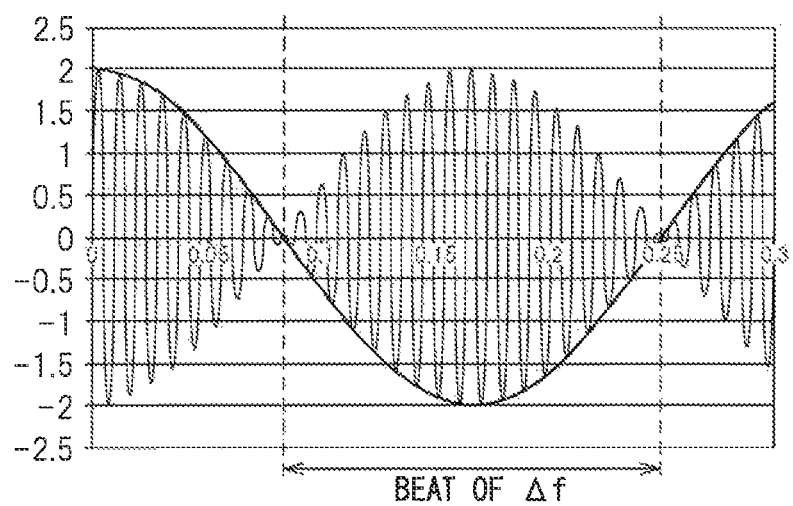
FIG. 12C is a diagram (3) for illustrating the synchronization problem in the plurality of power sources.

FIG. 12A to FIG. 12C are diagrams for illustrating a synchronization problem in a plurality of power sources, in which the diagrams illustrate a frequency synchronization problem in deviation between magnetic resonance frequencies used for power transfer in two power sources 1A [power transfer system 1] and 1B [power transfer system 2].

As depicted in FIG. 12A to FIG. 12C, a frequency of the high frequency power supply unit 12B of the power source 1B deviates by Δf from a frequency f of the high frequency power supply unit 12A of the power source 1A (f+Δf), a beat occurs in the power receiver 2 that have received power transfer from the two power sources 1A and 1B.

In other words, the LC resonator 21a of the power receiver 2 resonates with a magnetic field of the frequency f from the LC resonator 11aA of the power source 1A and a magnetic field of the frequency (f+Δf) from the resonator 11aB of the power source 1B to receive power.

In this situation, even when Δf is about a few hertz, an output of the LC resonator 21a of the power receiver 2 includes the beat, as depicted in FIG. 12B and FIG. 12C. Then, the output of the LC resonator 21a including the beat is input to the battery unit 25 through the power supply circuit 22.

Specifically, when the frequency from the LC resonator 11aA of the power source 1A is 10 M [Hz] and the frequency from the LC resonator 11aB of the power source 1B is 10 M+1 [Hz], a beat of 1 [Hz] occurs.

Thus, regardless of how highly precise the oscillator may be, it is difficult to avoid the occurrence of a beat as long as the LC resonators 11aA and 11aB are controlled asynchronously, leading to reduction in power transfer efficiency (for example, reduction to a half or less).

As a result, power transmitted to the power receiver 2 is significantly reduced. In other words, when a plurality of power transfer sources are present, a synthesized magnetic field generates a beat even when driving frequencies deviate slightly, which significantly reduces power transfer efficiency.

Such a difference between the resonant frequencies of the power sources 1A and 1B occurs, for example, due to an element to be used and a manufacturing stage, an ambient temperature of the power sources 1A and 1B arranged, or other factors.

Figure 13A:
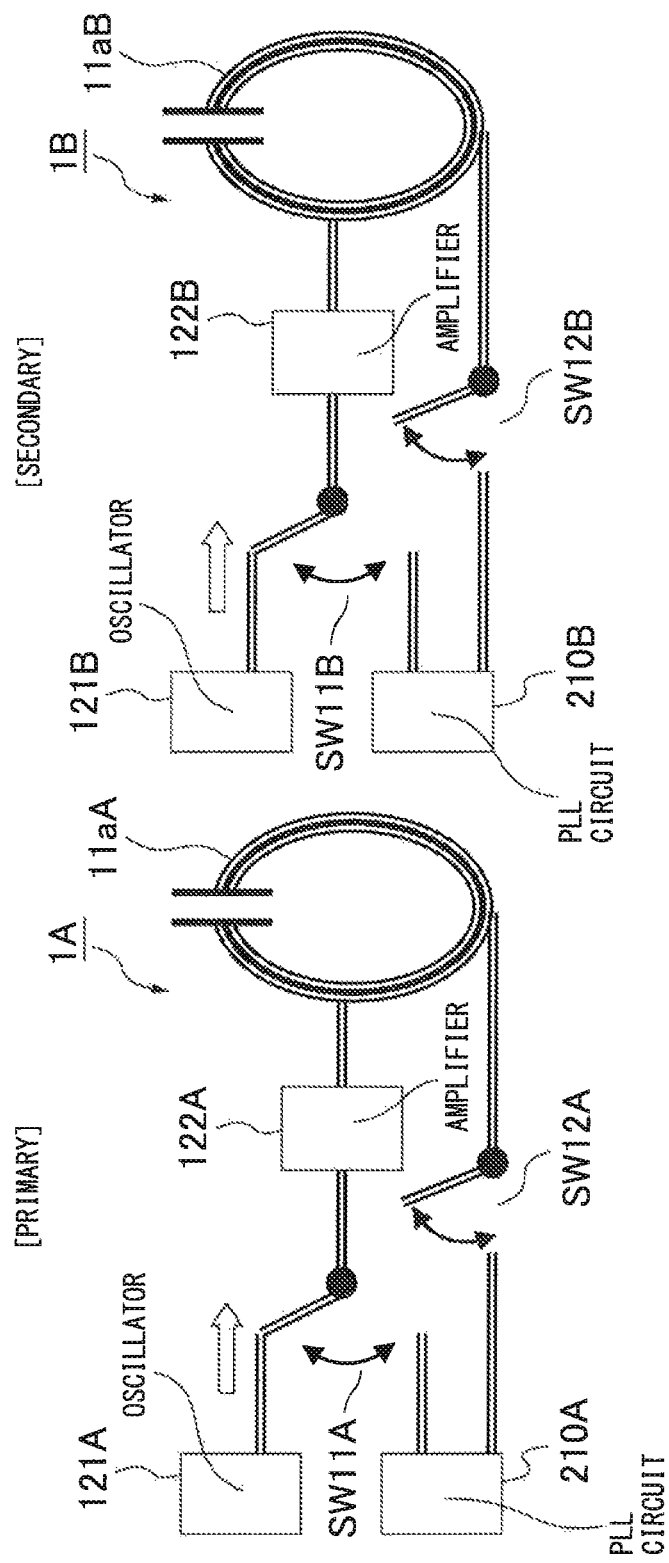
FIG. 13A is a diagram (1) for illustrating a first synchronization method against the synchronization problem in the plurality of power sources.
Figure 13B:
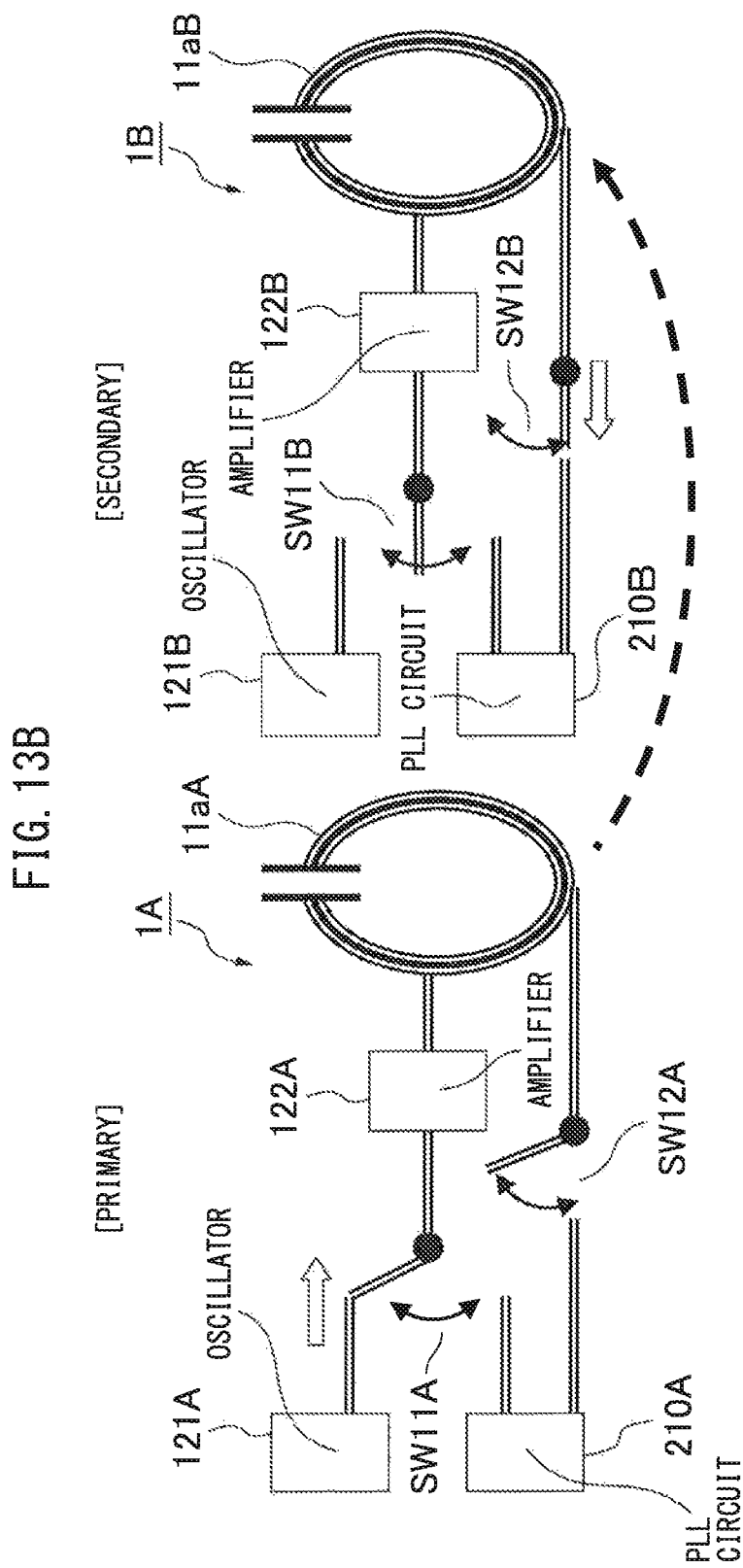
FIG. 13B is a diagram (2) for illustrating the first synchronization method against the synchronization problem in the plurality of power sources.
Figure 13C:
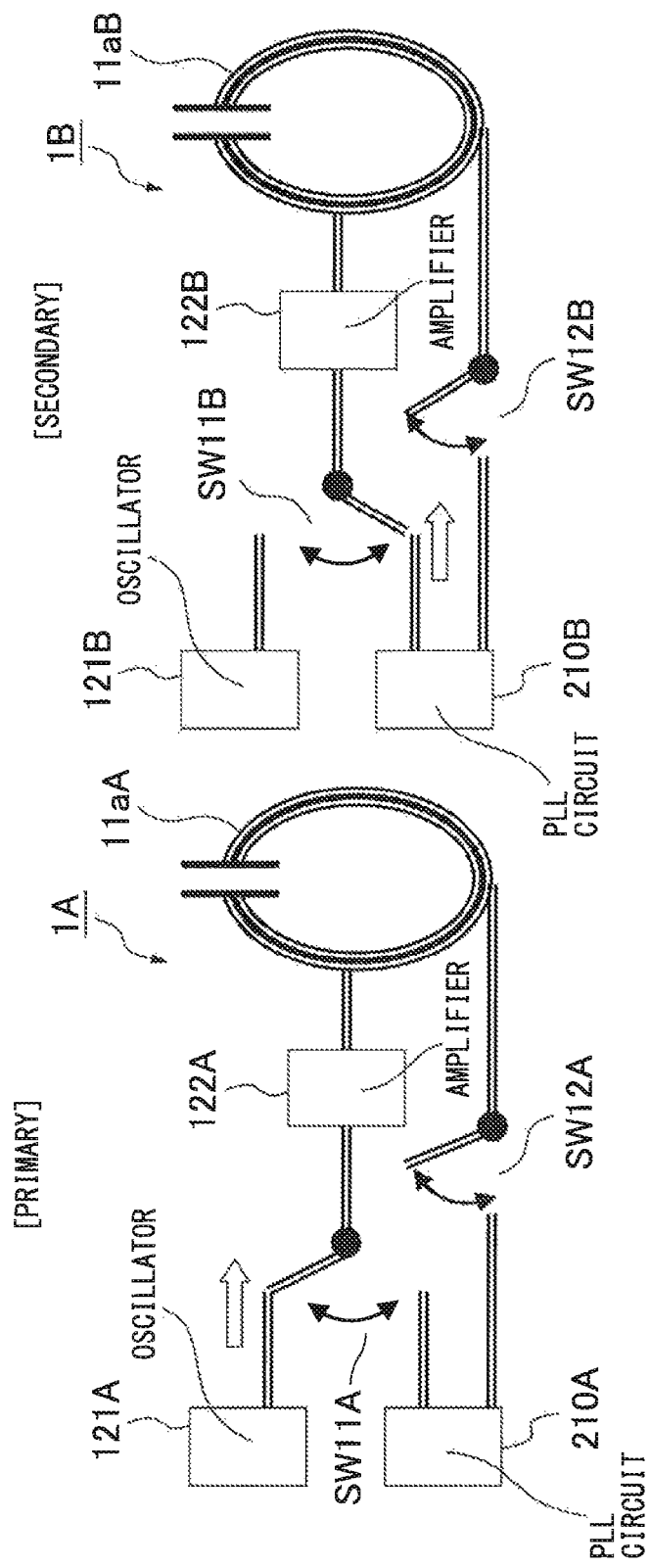
FIG. 13C is a diagram (3) for illustrating the first synchronization method against the synchronization problem in the plurality of power sources.

FIG. 13A to FIG. 13C are diagrams for illustrating a first synchronization method against the synchronization problem in the plurality of power sources. FIG. 13A depicts a situation in which, for example, the two power sources 1A and 1B are distant from each other and do not simultaneously transmit power to the same power receiver (2). FIG. 13B and FIG. 13C depict a situation in which, for example, the two power sources 1A and 1B are close to each other and transmit power to the same power receiver (2).

As depicted in FIG. 13A to FIG. 13C, the power sources 1A and 1B respectively include oscillators 121A and 121B, amplifiers 122A and 122B, PLL (Phase Locke Loop) circuits 210A and 210B, and two switches SW11A, SW12A and SW11B, SW12B, respectively.

The circuits 210A and 210B are not limited to PLL circuits, and circuits capable of controlling synchronization (synchronization circuits), for example, such as DLL (Delay Locked Loop) circuits, can be applied from wide choices. In addition, the oscillators 121A and 121B may be circuits using quartz or synchronization circuits such as PLL circuits.

First, as depicted in FIG. 13A, for example, when the two power sources 1A and 1B are distant from each other and power transfer areas of each other do not overlap, in other words, when the two power sources 1A and 1B do not simultaneously transmit power to the same power receiver (2), the power sources 1A and 1B, respectively, are designated as primary ones.

Specifically, without synchronization processing, the primary power sources 1A and 1B, respectively, amplify frequencies of the respective oscillators 121A and 121B by the amplifiers 122A and 122B and output the amplified frequencies to transmit power independently.

Next, with reference to FIG. 13B and FIG. 13C, a description will be given of a situation in which the two power sources 1A and 1B simultaneously transmit power to the same power receiver (2). This is, for example, a situation in which the two power sources 1A and 1B are close to each other or one of the power sources 1A and 1B starts output and the output overlaps an output of the other one thereof. One of the power sources (for example, 1A) is designated as a primary one and the other power source (for example, 1B) is designated as a secondary one.

FIG. 13B and FIG. 13C will illustrate an example using the two power sources 1A and 1B. However, even when three or more power sources are arranged, similarly, one of the power sources is designated as a primary one and the remaining power sources are designated as secondary ones.

In designation of the power sources as a primary or secondary one, for example, the above-described master power source may be designated as a primary power source and the above-described one or more slave power sources may be designated as secondary power sources. Alternatively, designation of the primary and secondary power sources may be made independently.

Specifically, for example, one of slaves may be designated as a primary power source, and the other one or more slaves and the master may be designated as secondary power sources. In FIG. 13B and FIG. 13C, 1A is designated as a primary power source and 1B is designated as a secondary power source.

As depicted in FIG. 13B, when synchronization is started, the primary power source 1A continues output at a frequency of the own oscillator 121A thereof. In this situation, the secondary power source 1B causes the switch SW11B to disconnect the own oscillator 121B thereof from the own amplifier 122B thereof to stop output.

At the same time, the secondary power source 1B connects the LC resonator 11aB (power transfer coil) with the PLL circuit 210B by the switch SW12B to receive power (power reception) from the LC resonator 11aA of the primary power source 1A by the LC resonator 11aB. In other words, the secondary power source 1B uses the LC resonator 11aB that has stopped power transfer as an antenna receiving an output signal of the primary power source 1A.

During the synchronization processing of the secondary power source 1B, for example, the output level of the primary power source 1A may be changed so as to be lowered for synchronization. Additionally, during the synchronization processing, for example, charging of all power receivers as power transfer destinations is preferably stopped by instruction of the master power source. When stopping the charging of the power receivers, the resonator system (LC resonator) of each power receiver is preferably turned off.

Thus, in the primary power source 1A, the oscillation frequency of the oscillator 121A thereof is used for synchronization, so that synchronization processing-related instructions are obviously controlled according to the instruction of the master power source.

The PLL circuit 210B of the secondary power source 1B performs phase synchronization (frequency tracking) with respect to the frequency of the oscillator 121A of the primary power source 1A according to a signal received by the LC resonator 11aB. The PLL circuit 210B tracks and then locks the frequency. As a result, the PLL circuit 210B of the secondary power source 1B outputs a signal (clock) having a frequency synchronized with the frequency of the oscillator 121A of the primary power source 1A.

Furthermore, as depicted in FIG. 13C, after completion of the synchronization of the PLL circuit 210B, the switch SW 12B cuts the connection between the LC resonator 11aB and the PLL circuit 210B and the switch SW11B connects the PLL circuit 210B and the amplifier 122B. In this way, the secondary power source 1B restarts power transfer by the output signal of the PLL circuit 210B synchronized with the frequency of the oscillator 121A of the primary power source 1A.

Accordingly, the first synchronization method can prevent the occurrence of a beat in the LC resonator 21a of the power receiver 2 receiving power from both the power sources 1A and 1B by matching the driving frequencies of the LC resonators 11bA and 11bB of the power sources 1A and 1B.

Driving frequency adjustment (synchronization processing) in the secondary power source 1B is preferably repeated, for example, at a predetermined time interval of from about a few minutes to about a few tens of minutes in order to compensate for changes due to an ambient temperature of the power sources 1A and 1B arranged, or other factors.

Figure 14A:
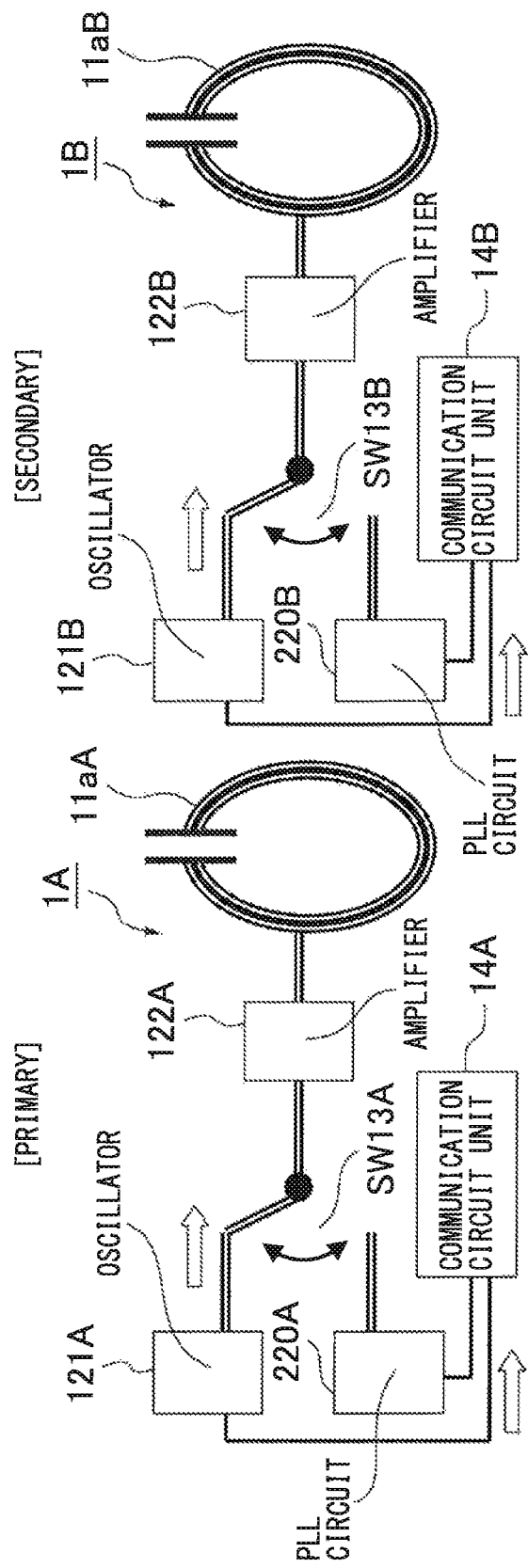
FIG. 14A is a diagram (1) for illustrating a second synchronization method against the synchronization problem in the plurality of power sources.
Figure 14B:
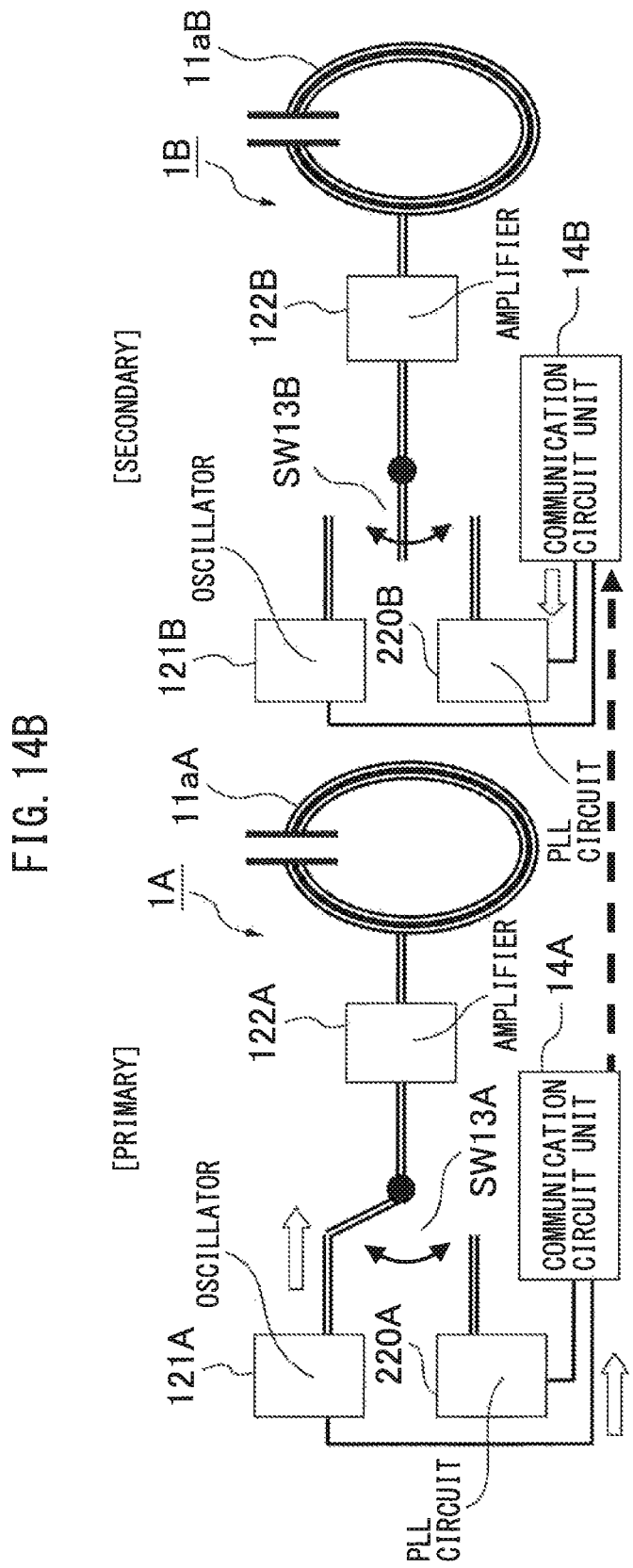
FIG. 14B is a diagram (2) for illustrating the second synchronization method against the synchronization problem in the plurality of power sources.
Figure 14C:
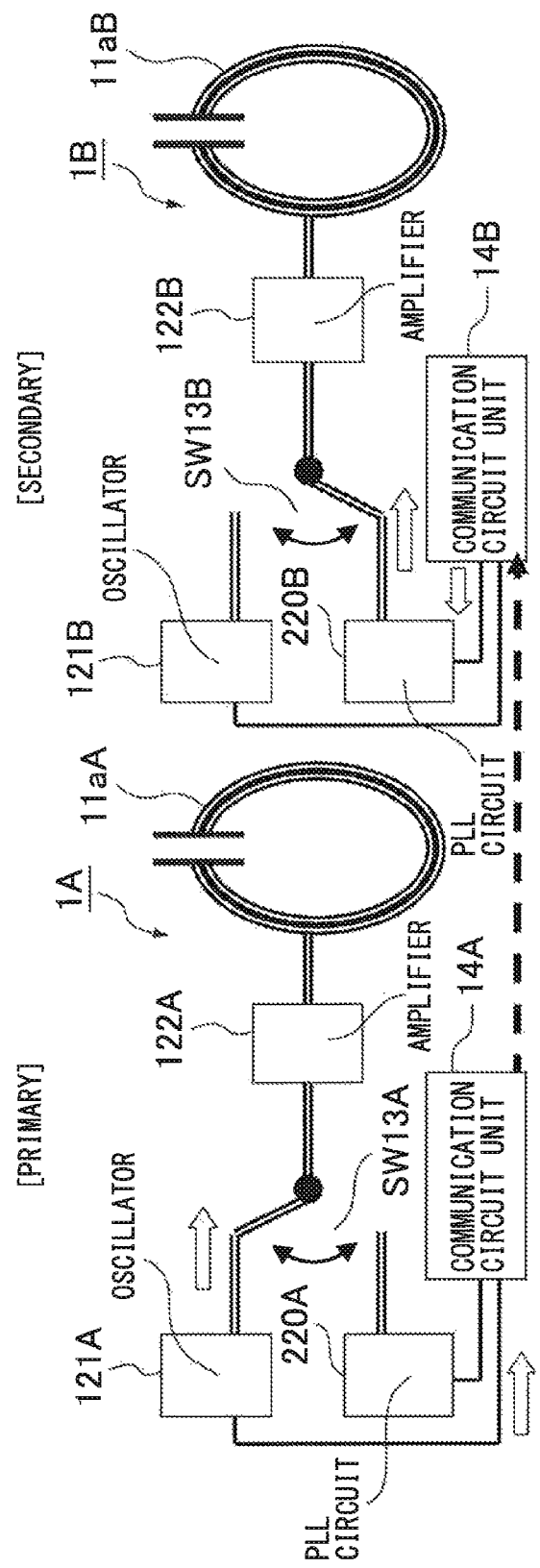
FIG. 14C is a diagram (3) for illustrating the second synchronization method against the synchronization problem in the plurality of power sources.

FIG. 14A to FIG. 14C are diagrams for illustrating a second synchronization method against the synchronization problem in the plurality of power sources. FIG. 14A depicts a situation in which, for example, the two power sources 1A and 1B are distant from each other and do not simultaneously transmit power to the same power receiver (2), whereas FIG. 14B and FIG. 14C depict a situation in which, for example, the two power sources 1A and 1B are close to each other and transmit power to the same power receiver (2).

As depicted in FIG. 14A to FIG. 14C, the power sources 1A and 1B respectively include oscillators 121A and 121B, amplifiers 122A and 122B, PLL circuits 220A and 220B, communication circuit units (short-distance communication circuits) 14A and 14B, and switches 13A and 13B, respectively. The circuits 220A and 220B are not limited to PLL circuits and, for example, may be synchronization circuits capable of controlling synchronization, such as DLL circuits, as described above.

The first synchronization method described with reference to FIG. 13A to FIG. 13C uses the LC resonator 11aB of the secondary power source 1B as the antenna to synchronize the frequency of the PLL circuit 210B of the secondary power source 1B with the frequency of the oscillator 121A of the primary power source LA.

On the other hand, the second synchronization method that will be described with reference to FIG. 14A to FIG. 14C uses the communication circuit unit 14A of the primary power source 1A and the communication circuit unit 14B of the secondary power source 1B to perform synchronization control of the frequency of the PLL circuit 220B of the secondary power source 1B.

First, as depicted in FIG. 14A, for example, when the two power sources 1A and 1B are distant from each other and power transfer areas of each other do not overlap, in other words, when the two power sources 1A and 1B do not simultaneously transmit power to the same power receiver (2), the power sources 1A and 1B respectively transmit power as primary power sources.

In other words, without synchronization processing, the primary power sources 1A and 1B amplify the frequencies of the respective oscillators 121A and 121B by the amplifiers 122A and 122B and outputs the frequencies to transmit power independently. This is the same as in FIG. 13A described above.

Next, with reference to FIG. 14B and FIG. 14C, a description will be given of a situation in which the two power sources 1A and 1B simultaneously transmit power to the same power receiver (2). This is, for example, a situation in which the two power sources 1A and 1B are close to each other or one of the power sources starts output and the output overlaps an output of the other power source. One of the power sources (for example, 1A) is designated as a primary one and the other one thereof (for example, 1B) is designated as a secondary one.

FIG. 14B and FIG. 14C illustrate an example of the two power sources 1A and 1B. However, even when three or more power sources are arranged, one of the power sources is designated as a primary power source and the remaining power sources are designated as secondary power sources.

In addition, as described above, in designation of a primary power source and secondary power sources, for example, the master power source may be a primary power source and the one or more slave power sources may be secondary power sources. Alternatively, designation of the primary and secondary power sources may be made independently.

As depicted in FIG. 14B, when synchronization is started, the primary power source 1A continues output at a frequency of the own oscillator 121A thereof and outputs a synchronization pattern obtained from the oscillator 121A through the communication circuit unit 14A.

In this situation, the secondary power source 1B causes the switch SW13B to cut off the connection between the own oscillator 121B thereof and the own amplifier 122B thereof to stop output. It is enough to stop the output of the secondary power source 1B only during the initial synchronization processing in which the PLL circuit 220B is synchronized (tracked) with the frequency of the oscillator 121A of the primary power source 1A and then connected with the amplifier 122B.

In other words, after that, it is unnecessary to stop the output of the secondary power source 1B during synchronization processing performed for a second time and thereafter in which the PLL circuit 220B of the secondary power source 1B is synchronized with the frequency of the oscillator 121A of the primary power source 1A (for example, at a time interval of from about a few minutes to about a few tens of minutes).

A radio signal including the synchronization pattern of the oscillator 121A output from the communication circuit unit 14A of the primary power source 1A is received by the communication circuit unit 14B of the secondary power source 1B, and the synchronization of the oscillator 121A is output to the PLL circuit 220B of the secondary power source 1B.

The PLL circuit 220B of the secondary power source 1B performs phase synchronization (frequency tracking) with respect to the frequency of the oscillator 121A of the primary power source 1A according to the synchronization pattern of the oscillator 121A received by the communication circuit unit 14B. As a result, the frequency of the PLL circuit 220B of the secondary power source 1B is synchronized with the frequency of the oscillator 121A of the primary power source 1A and locked at the frequency.

As a result, the PLL circuit 220B of the secondary power source 1B outputs a signal having the frequency synchronized with the frequency of the oscillator 121A of the primary power source 1A.

Maintaining the output level of the primary power source 1A at a usual level during the synchronization processing of the secondary power source 1B allows the primary power source 1A to continue power transfer to the power receiver (2).

In addition, in the initial synchronization processing in which the PLL circuit 220B of the secondary power source 1B is synchronized and then connected with the amplifier 122B, it is preferable, for example, to stop charging of all power receivers as power transfer destinations by instruction of the master power source. When stopping the charging of the power receivers, the resonance system (LC resonator) of each power receiver is preferably turned off.

Furthermore, as depicted in FIG. 14C, after completion of the synchronization of the PLL circuit 220B, the switch SW13B connects the PLL circuit 220B with the amplifier 122B. As a result, the secondary power source 1B restarts power transfer by the output signal of the PLL circuit 220B synchronized with the frequency of the oscillator 121A of the primary power source 1A.

In the secondary power source 1B, it is only in the initial synchronization processing that the PLL circuit 220B after having completed the synchronization is connected with the amplifier 122B. During synchronization processing performed for a second time and thereafter, frequency synchronization is performed while maintaining the connection between the PLL circuit 220B and the amplifier 122B.

In this manner, the second synchronization method can prevent the occurrence of a beat in the LC resonator 21a of the power receiver 2 receiving power from both the power sources 1A and 1B by matching the driving frequencies of the resonators 11bA and 11bB of the power sources 1A and 1B.

Driving frequency adjustment (synchronization processing for a second time and thereafter) in the secondary power source 1B is preferably repeated, for example, at a predetermined time interval of from about a few minutes to about a few tens of minutes in order to compensate for changes due to an ambient temperature of the power sources 1A and 1B arranged, or other factors.

Figure 15C:
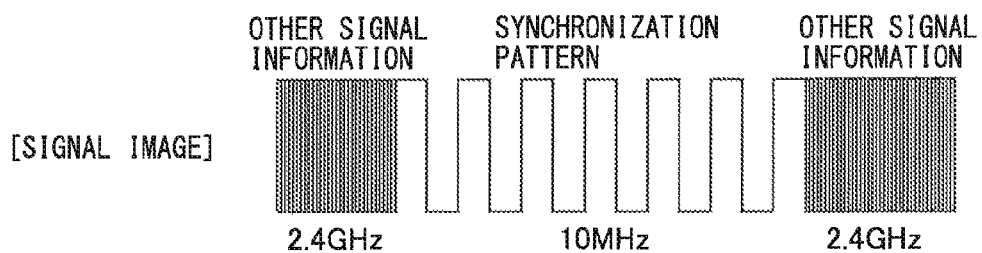
FIG. 15C is a diagram (3) for illustrating the synchronization pattern-mixed communication applied to the second synchronization method illustrated with reference to FIG. 14A to FIG. 14C.

FIG. 15A to FIG. 15D are diagrams for illustrating a synchronization pattern-mixed communication applied to the second synchronization method described with reference to FIG. 14A to FIG. 14C. FIG. 15A depicts an image (concept) of a radio signal output from the communication circuit unit 14A of the primary power source 1A, and FIG. 15B depicts an image of a radio signal received by the communication circuit unit 14B of the secondary power source 1B.

Figure 15D:
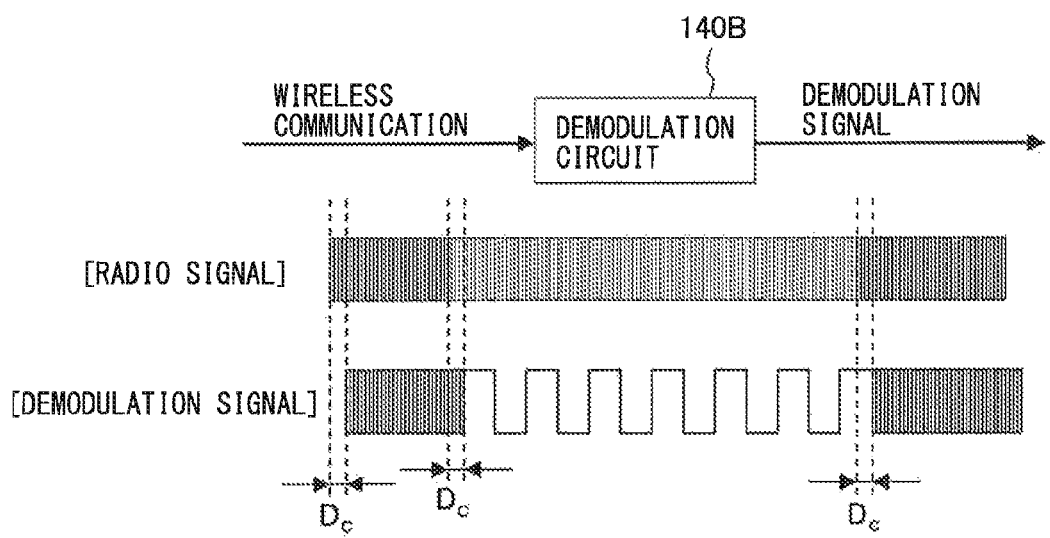
FIG. 15D is a diagram (4) for illustrating the synchronization pattern-mixed communication applied to the second synchronization method illustrated with reference to FIG. 14A to FIG. 14C.

In addition, FIG. 15C depicts an image of a signal before modulation input to the communication circuit unit 14A of the primary power source 1A, and FIG. 15D depicts a radio signal input to the communication circuit unit 14B (demodulation circuit 140B) of the secondary power source 1B and a demodulation signal.

First, as depicted in FIG. 15A, in the primary power source 1A, the communication circuit unit 14A outputs a signal having a wireless communication frequency (for example, 2.4 GHz) in which a pattern synchronized with a frequency of the oscillator 121A (for example, 10 MHz) is mixed.

In other words, the communication circuit unit 14A of the primary power source 1A performs a synchronization pattern-mixed communication with the communication circuit unit 14B of the secondary power source 1B. The frequency, the wireless communication frequency, and the like of the oscillator 121A are not limited to 10 MHz and 2.4 GHz and various frequencies can be applied.

Furthermore, as depicted in FIG. 15B, in the secondary power source 1B, the communication circuit unit 14B receives the signal having the wireless communication frequency in which the synchronization pattern is mixed and outputs a synchronization pattern SP indicating the frequency of the oscillator 121A and a synchronization signal SWS indicating a valid range thereof.

Then, the frequency of the PLL circuit 220B of the secondary power source 1B is synchronized with the frequency of the oscillator 121A of the primary power source 1A according to the synchronization pattern SP and the synchronization window signal SWS and locked at the frequency (for example, 10 MHz). As a result, the PLL circuit 220B of the secondary power source 1B outputs a signal having the frequency synchronized with the frequency of the oscillator 121A of the primary power source 1A.

The synchronization pattern mixed in the signal having the wireless communication frequency can be any as long as the pattern includes information that transmits a synchronization frequency (the frequency of the oscillator 121A of the primary power source 1A). The synchronization pattern does not necessarily have to be a repetitive pattern of an actual synchronization frequency (or a frequency obtained by multiplying or dividing the frequency by a constant).

For example, as depicted in FIG. 15C, in the primary power source 1A, the communication circuit unit 14A (modulation circuit) modulates a synchronization pattern-mixed signal in which a synchronization pattern of 10 MHz is mixed between signals of 2.4 GHz transmitting other communication information, and outputs as a radio signal.

The radio signal output from the communication circuit unit 14A of the primary power source 1A is demodulated by the communication circuit unit 14B (demodulation circuit 140B) of the secondary power source 1B, and the synchronization pattern of 10 MHz and the other communication information of the 2.4 GHz signals are output.

The demodulation circuit 140B of the secondary power source 1B is preferably formed as hardware that can demodulate the synchronization pattern indicating the frequency of the oscillator 121A of the primary power source 1A at an accurate timing.

Thus, forming the demodulation circuit 140B as the hardware allows a delay during demodulation to be used, for example, as a constant clock delay Dc, so that the synchronization processing of the PLL circuit 220B of the secondary power source 1B can be performed accurately.

Accordingly, the second synchronization method described with reference to FIG. 14A to FIG. 15G has an advantage in that it is unnecessary to stop power transfer of the secondary power source 1B during synchronization processing for a second time and thereafter, unlike the first synchronization method described with reference to FIG. 13A to FIG. 13C.

In the above description, the method for synchronizing the driving frequencies of the LC resonator 11aA of the primary power source 1A and the resonator 11aB of the secondary power source 1B is not limited to those described above, and obviously, various methods can be applied.

FIG. 16 is a block diagram depicting one example of the wireless power transfer system of the present embodiment. As depicted in FIG. 16, the power source 1 includes the wireless power transfer unit 11, the high frequency power supply unit 12, the power transfer control unit 13, and the communication circuit unit 14.

The power receiver 2 includes the wireless power reception unit 21, the power reception circuit unit 22, the power reception control unit 23, the communication circuit unit 24, and the battery unit 25. The power source 1 and the power receiver 2 communicate with each other through the respective communication circuit units 14 and 24 and perform power transfer by a resonance system (a magnetic field or an electric field) between the wireless power transfer unit 11 and the wireless power reception unit 21.

Figure 17:
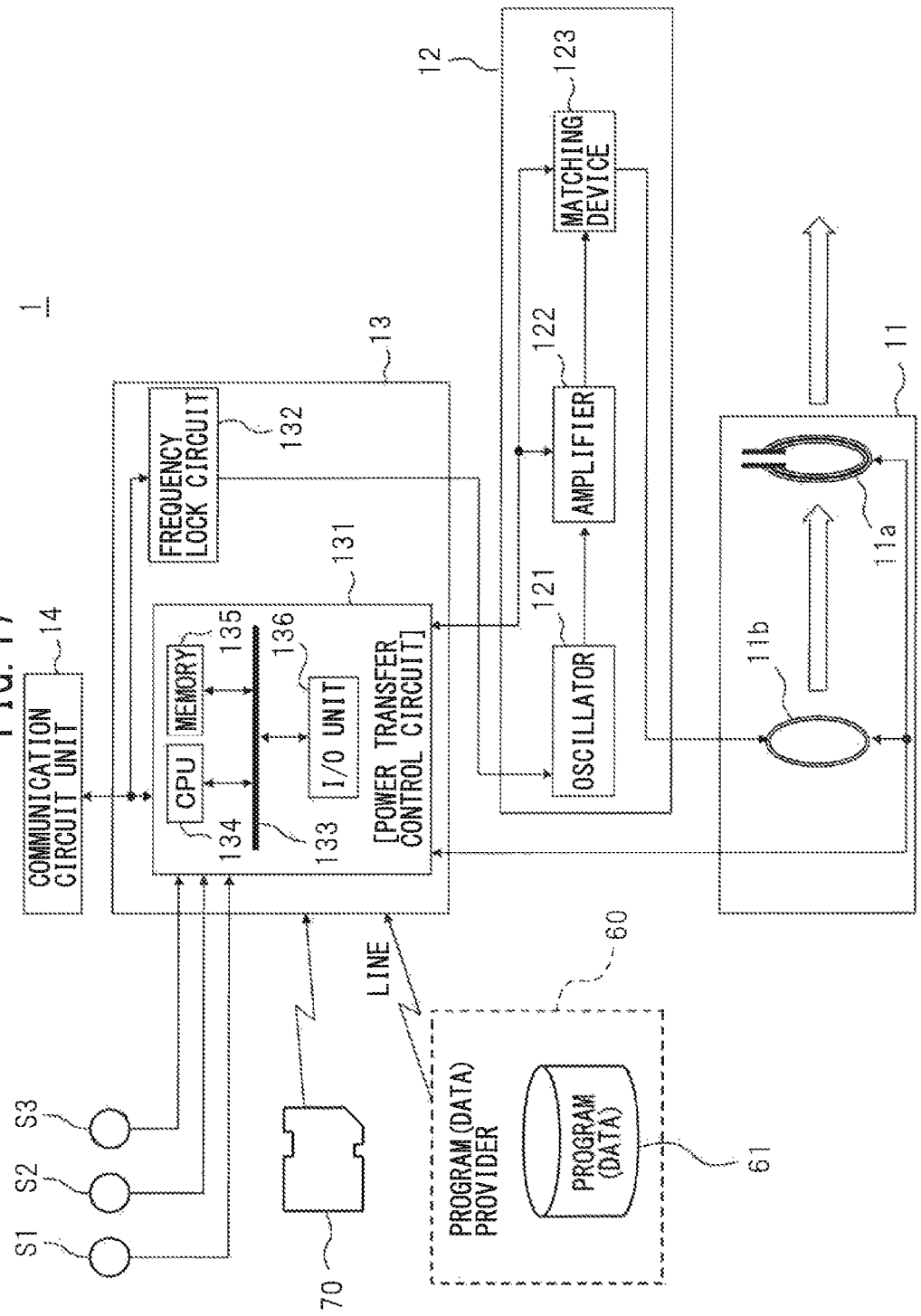
FIG. 17 is a block diagram depicting one exemplary power source in the wireless power transfer system of FIG. 16.

FIG. 17 is a block diagram depicting one exemplary power source in the wireless power transfer system. As depicted in FIG. 16 and FIG. 17, in the power source 1, the wireless power transfer unit 11 includes the LC resonator 11a and the power supply coil 11b. The high frequency power supply unit 12 includes an oscillator 121, an amplifier 122, and a matching device 123.

The power transfer control unit 13 includes a power transfer control circuit 131 and a frequency lock circuit 132. The frequency lock circuit 132 corresponds to, for example, the PLL circuit 220A and 220B described with reference to FIG. 14A to FIG. 14C.

As described above, the frequency lock circuit 132 receives a synchronization signal from the communication circuit unit 14 to perform synchronization processing of the oscillator 121 at a predetermined interval (for example, at an interval of from a few minutes to a few tens of minutes). The oscillator 121 generates a driving signal having a frequency of a predetermined frequency (for example, 6.78 MHz) and outputs the signal to the wireless power transfer unit 11 (power supply coil 11b) through the amplifier 122 and the matching device 123.

The power transfer control circuit 131 includes a CPU (calculation processing unit) 134, a memory 135, and an input/output circuit (an I/O unit) 136 connected to each other by an internal bus 133. The memory 135 includes a rewritable non-volatile memory such as a flash memory, a DRAM (Dynamic Random Access Memory), and the like, and executes various pieces of processing (software programs) of the power source, which will be described later.

The power source 1 includes, for example, a position sensor S1 detecting a position of the power receiver 2, a human detection sensor (a biodetection sensor) S2 detecting a living body, such as a human or an animal, and an abnormality detection sensor S3 detecting abnormality of the power source 1.

Outputs of the respective sensors S1 to S3 are input to, for example, the CPU 134 through the I/O unit 136 and used in processing in accordance with a software program (a wireless power transfer program or a power source control program) stored in the memory 135.

The wireless power transfer program (the power source control program) may be stored, for example, in the memory 135 from a portable storage medium (such as an SD (secure digital) memory card) 70 storing the program through the I/O unit 136.

Alternatively, the program may be stored in the memory 135 from a hard disk device 61 of a program (data) provider 60 via a line and the I/O unit 136. The line from the hard disk device 61 to the I/O unit 136 may be a wireless communication line using the communication circuit unit 14.

In addition, other examples of the portable storage medium (a computer readable storage medium) storing the wireless power transfer program include storage media such as a DVD (digital versatile disk) disk and a Blu-ray disc. Furthermore, FIG. 17 depicts a mere example of the power source 1, and various changes and modifications can be made.

Figure 18:
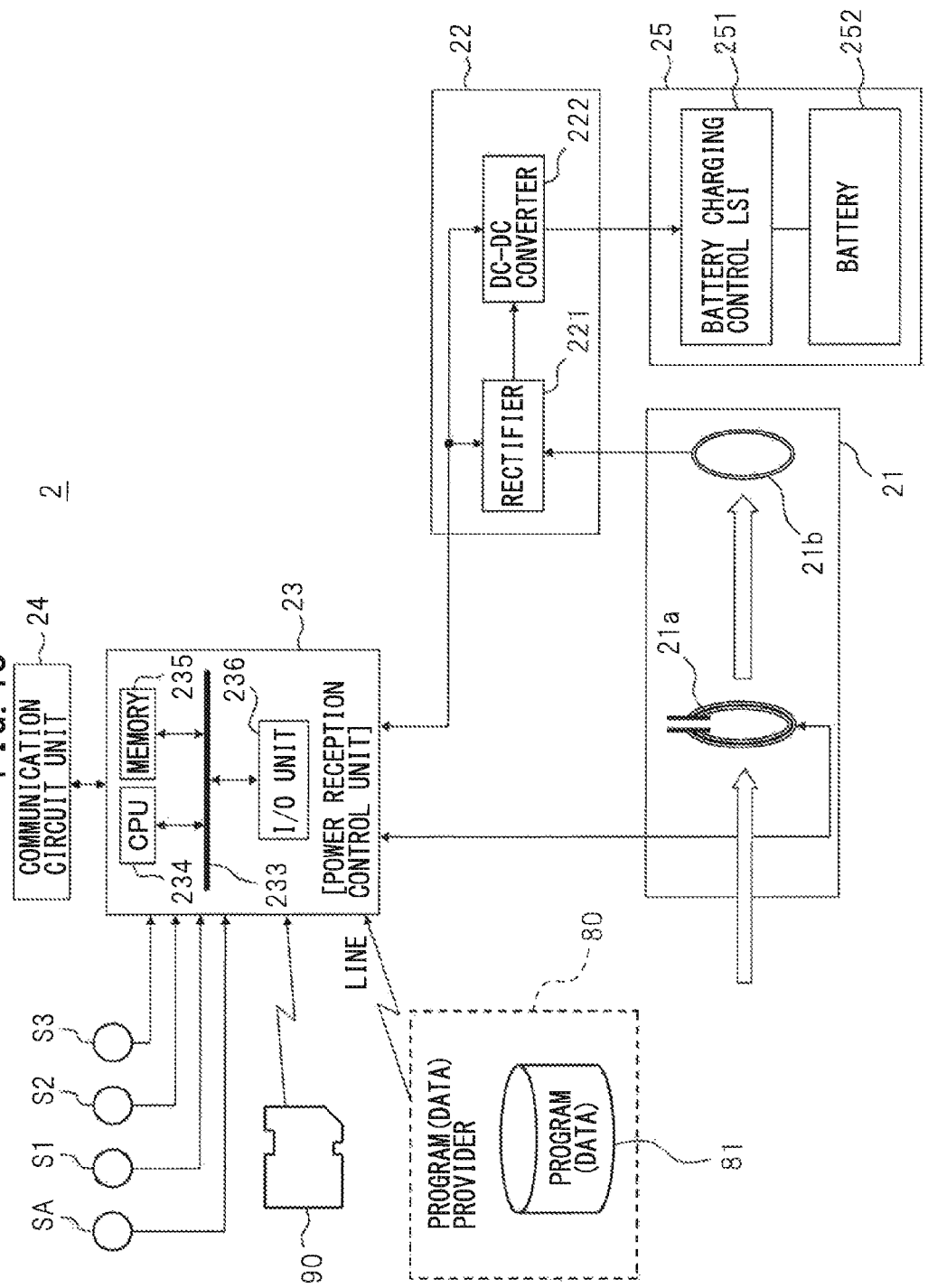
FIG. 18 is a block diagram depicting one exemplary power receiver in the wireless power transfer system of FIG. 16.

FIG. 18 is a block diagram depicting one exemplary power receiver in the wireless power transfer system of FIG. 16. As depicted in FIG. 16 and FIG. 18, in the power receiver 2, the wireless power reception unit 21 includes the LC resonator 21a and the power extraction coil 21b. The power reception circuit unit 22 includes a rectifier 221 and a DC-DC converter 222, and the battery unit 25 includes a battery charging control LSI 251 and a battery 252.

The power reception control unit 23 includes a CPU (calculation processing unit) 234, a memory 235, and an input/output circuit (an I/O unit) 236. The memory 235 includes a rewritable non-volatile memory such as a flash memory, a DRAM, and the like, and executes various pieces of processing (software programs) of the power receiver, which will be described later.

The power receiver 2 may be a smart phone, a notebook computer, or the like that originally includes circuits corresponding to the communication circuit unit 14 and the power reception control unit 23, so that such circuits may be usable. Alternatively, for example, the power reception control unit 23 may be newly provided as a module. In addition, when the power receiver 2 does not include circuits corresponding to the communication circuit unit 14 and the power reception control unit 23, those circuits will be newly provided.

The power receiver 2 includes, for example, a sensor (a three-dimensional acceleration sensor) SA capable of detecting the posture information (θx, θy, θz) of the power receiver 2. Such an acceleration sensor SA is originally incorporated, for example, in a smart phone or the like, so that the sensor can be used. When the power receiver 2 does not include the acceleration sensor SA capable of detecting the posture information, it is, for example, possible to perform 2-dimensional charging, although 3-dimensional charging described above cannot be performed.

Furthermore, even in the power receiver 2, similarly to the power source 1, the position sensor S1, the human detection sensor S2, and the abnormality detection sensor S3 may be provided. Alternatively, for example, only the abnormality sensor S3 may be provided and the other position sensor S1 and the human detection sensor S2 may be omitted.

Outputs of the respective sensors SA and S1 to S3 are, for example, input to the CPU 234 through the I/O unit 236 and used in processing in accordance with a software program (a wireless power transfer program or a power receiver control program) stored in the memory 235.

The wireless power transfer program (the power receiver control program) may be stored, for example, in the memory 235 from a portable storage medium (such as a micro SD memory card) 90 storing the program through the I/O unit 236.

Alternatively, the program may be stored in the memory 235 from a hard disk device 81 of a program (data) provider 80 through a line and the I/O unit 236. The line from the hard disk device 81 to the I/O unit 236 may be a wireless communication line using the communication circuit unit 24.

In addition, other examples of the portable storage medium (a computer-readable storage medium) storing the wireless power transfer program include storage media such as a DVD disk and a Blu-ray disc. Furthermore, FIG. 18 depicts a mere example of the power receiver 2, and various changes and modifications can be made.

Hereinafter, with reference to FIG. 19 to FIG. 24, a description will be given of processing in the wireless power transfer system of the present embodiment. In FIG. 19 to FIG. 24, a direction from up to down in each drawing represents a flow of time. Additionally, it is assumed that a plurality of power sources (LC resonators: resonance coils) are provided on the power source, although the number of the power sources is not indicated.

Furthermore, even when a single power source includes a plurality of LC resonators, the power source is treated as being equivalent to a plurality of power sources. Accordingly, as in the present embodiment, designating one of a plurality of power sources as a master power source means that a single calculation processing unit (CPU) controls all the LC resonators included in the master power source and the one or more slave power sources.

Figure 19:
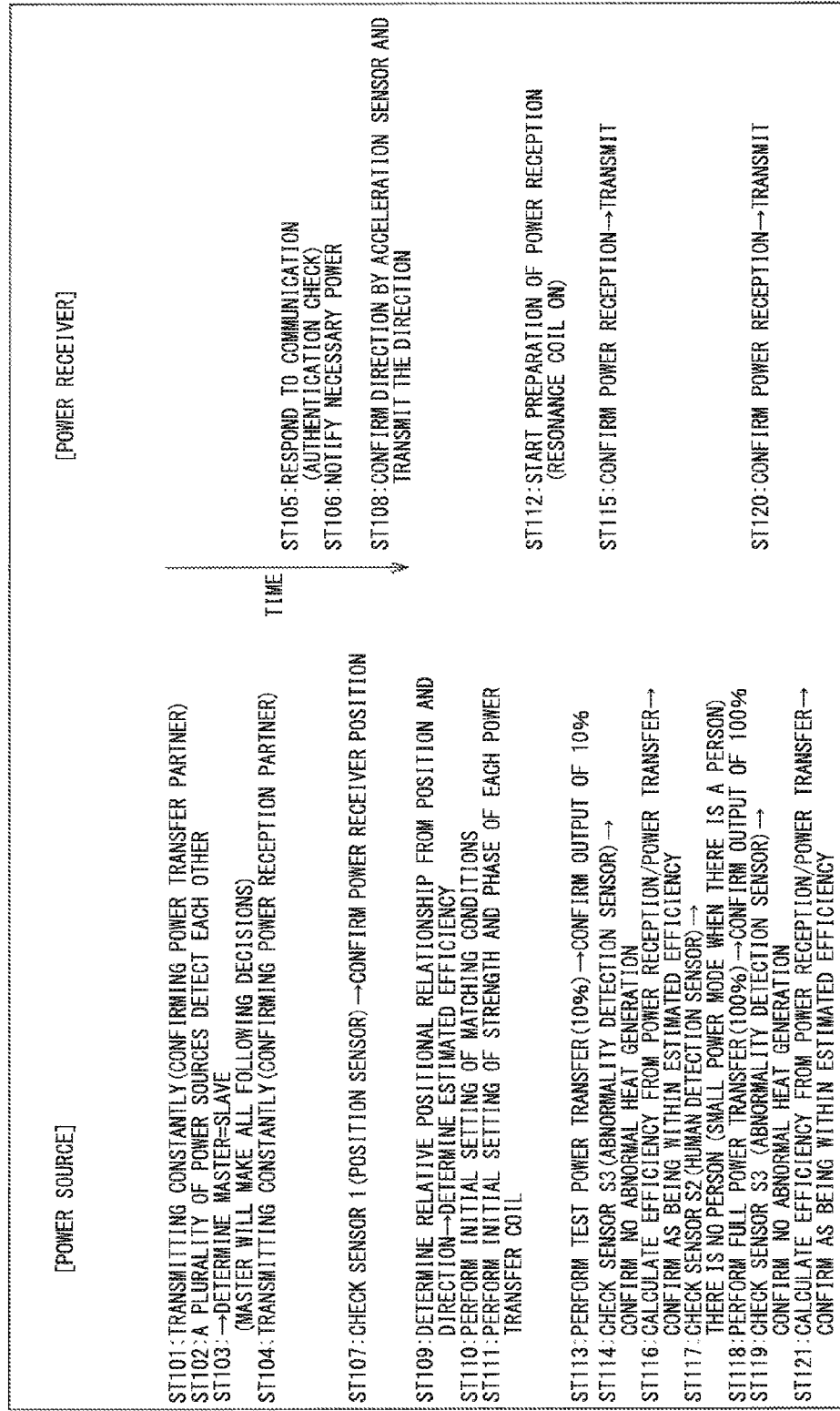
FIG. 19 is a flowchart for illustrating a first example of processing in the wireless power transfer system of the embodiment.

FIG. 19 is a flowchart for illustrating a first example of processing in the wireless power transfer system of the present embodiment, which illustrates processing performed when the power source includes a plurality of LC resonators and the power receiver is a single power receiver 2. As described above, a single power source 1 may include a plurality of LC resonators 11a. However, in order to simplify description, the description will be given on an assumption that a single power source 1 has a single LC resonator 11a.

As depicted in FIG. 19, first, the power source is constantly transmitting (confirming power transfer partners: ST101), in which a plurality of power sources 1A, 1B, 1C, etc., detect each other (ST102). One of the plurality of power sources is designated as a master power source 1A and the other ones thereof are designated as slave power sources 1B, 1C, etc., so that the master and the slaves are determined (ST103). In the following processing, all decisions will be made by the master power source 1A, namely, the CPU 134 of the master power source 1A.

In addition, during the constant transmission (confirming the power reception partner: ST104), the power receiver 2 of the power receiver responds to communication (authentication check: ST105) and notifies the power source (the master power source 1A) of necessary power (ST106).

The power source checks the sensor S1 (position sensor) to confirm a position of the power receiver (ST107), and the power receiver 2 confirms a direction thereof by the acceleration sensor SA and transmits the confirmed direction (ST108).

The power source determines a relative positional relationship from the confirmed position (position information) and the direction (posture information) transmitted from the power receiver 2, determines an estimated efficiency (ST109), and performs an initial setting of matching conditions (ST110).

In addition, the power source (master power source 1A) performs initial settings of a strength and a phase of each power transfer coil (each of the LC resonators of the plurality of power sources 1A, 1B, 1C, etc.) (ST111). Then, the power receiver (power receiver 2) starts preparation of power reception, i.e., turns on the resonance coil (LC resonator) 21a (ST112).

Next, the power source performs a test power transfer (for example, 10%) to confirm the output of 10% (ST113), and checks abnormality by the sensor S3 (abnormality detection sensor), i.e., confirms no abnormal heat generation (ST114). The output of 10% in the test power transfer is a mere example and the output of the test power transfer is not limited thereto. At this time, the power receiver 2 confirms power reception and transmits that the power reception has been done (ST115).

The power source calculates efficiency from the power reception and the power transfer and confirms whether the efficiency is within the estimated efficiency (ST116). In addition, the power source checks the sensor S2 (human detection sensor) and performs power transfer in a small power mode when a person is present (ST117), whereas performs a full power transfer (100% power transfer) when no person is present to confirm the output of 100% (ST118).

Additionally, the power source checks the sensor S3 (abnormality detection sensor) to confirm that there is no abnormal heat generation (ST119). The abnormal detection sensor S3 may be provided either in the power source 1 or the power receiver 2. When the abnormality detection sensor S3 is provided in the power receiver 2, the presence or absence of abnormal heat generation confirmed by the abnormality detection sensor S3 will be transmitted to the master power source 1A.

The power receiver 2 confirms power reception and transmits that the power reception has been done (ST120). The power source calculates efficiency from the power reception and the power transfer and confirms whether the efficiency is within the estimated efficiency (ST121). In other words, power transfer efficiency can be calculated from power transmitted from the power source (all the power sources 1A, 1B, etc.,) and power received by the power receiver 2. The power source confirms whether the calculated efficiency is within the efficiency estimated in advance. When the calculated efficiency is not within the estimated efficiency, the power source decides, for example, that something abnormal has occurred and executes power transfer stop, alarm generation, abnormality display, and the like.

Figure 20:
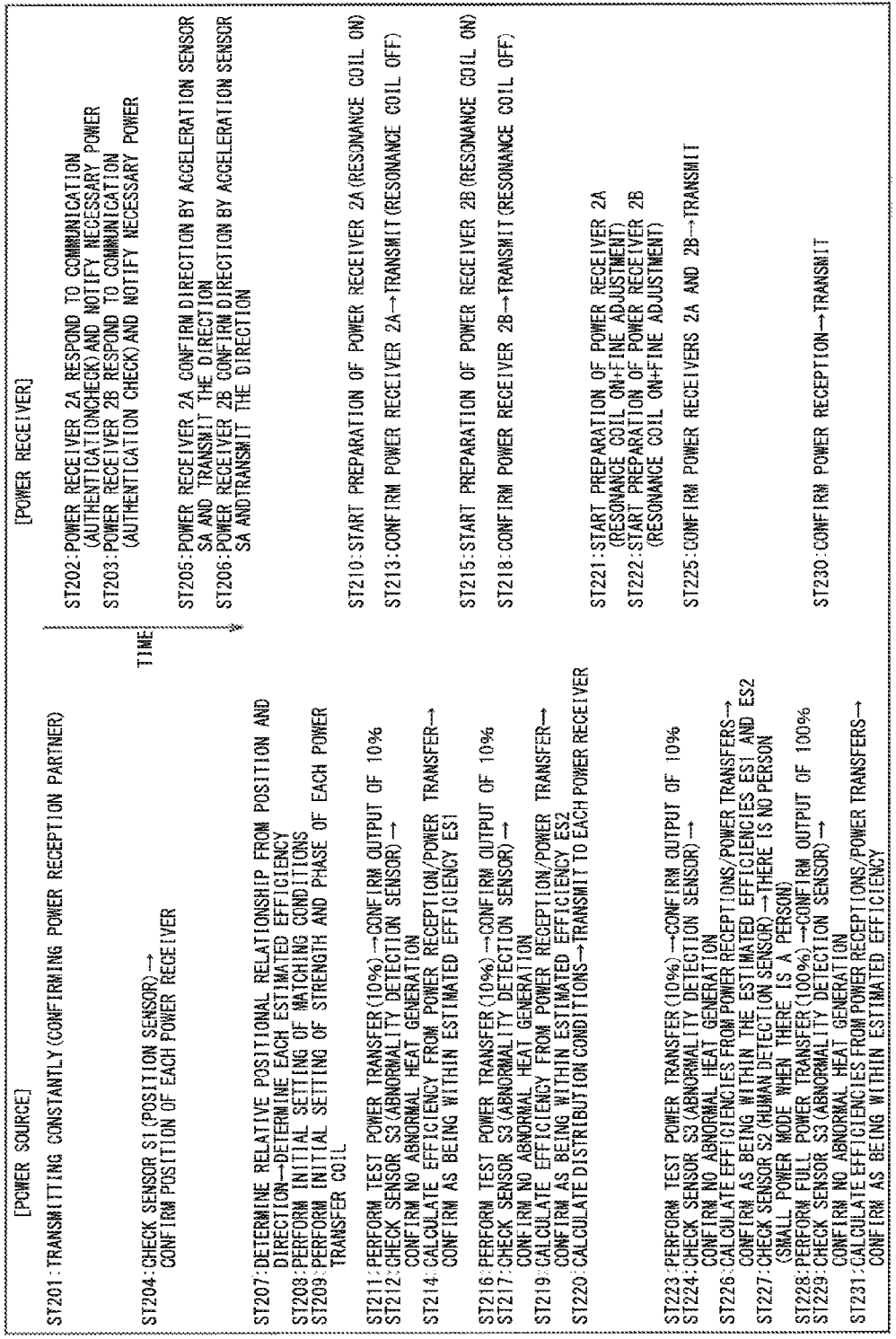
FIG. 20 is a flowchart for illustrating a second example of processing in the wireless power transfer system of the embodiment.

FIG. 20 is a flowchart for illustrating a second example of processing in the wireless power transfer system of the present embodiment, which illustrates processing performed when the power source includes a plurality of power sources 1A, 1B, 1C, etc., and the power receiver includes two power receivers 2A and 2B.

As depicted in FIG. 20, first, the power source is constantly transmitting (confirming a power transfer partner: ST201). In the power receiver, the power receiver 2A responds to the communication (authentication check) and notifies necessary power (ST202), and the power receiver 2B responds to the communication (authentication check) and notifies necessary power (ST203).

The power source checks the sensor S1 (position sensor) to confirm positions of the respective power receivers 2A and 2B (position information) (ST204). In addition, in the power receiver, the power receiver 2A confirms a direction thereof (posture information) by the acceleration sensor SA and transmits the confirmed direction (ST205), and the power receiver 2B confirms a direction thereof (posture information) by the acceleration sensor SA and transmits the confirmed direction (ST206).

The power receiver determines a relative positional relationship from the position (position information) and the direction (posture information) to determine each estimated efficiency (ST207). In addition, the power receiver performs an initial setting of matching conditions (ST208) and performs initial settings of a strength and a phase of each power transfer coil (ST209).

Then, the power receiver 2A starts preparation of power reception, i.e., turns on the resonance coil 21aA (ST210). The power source performs a test power transfer (for example, 10%) to confirm the output of 10% (ST211), and checks abnormality by the sensor S3 (abnormality detection sensor), i.e., confirms no abnormal heat generation (ST212). As described above, the abnormality detection sensor S3 may be provided in the power receivers 2A and 2B.

At this time, the power receiver 2A confirms power reception, then transmits that the power reception has been done, and turns off the resonance coil 21aA (ST213). The power source calculates efficiency from the power reception and the power transfer and confirms whether the efficiency is within the estimated efficiency 1 (ST214).

Next, the power receiver 2B starts preparation of power reception, i.e., turns on the resonance coil. 21aA (ST215). The power source performs a test power transfer (for example, 10%) to confirm the output of 10% (ST216), and checks abnormality by the sensor S3 (abnormality detection sensor), i.e., confirms no abnormal heat generation (ST217).

At this time, the power receiver 2B confirms power reception, then transmits that the power reception has been done, and turns off the resonance coil 21aB (ST218). The power source calculates efficiency from the power reception and the power transfer and confirms whether the efficiency is within the estimated efficiency 2 (ST219).

In this manner, the present embodiment performs the test power transfer in turn to the plurality of power receivers 2A and 2B to confirm the presence or absence of abnormality and then calculates distribution conditions for the plurality of power receivers 2A and 2B, as well as performs resonance adjustments (fine adjustments) described with reference to FIG. 8E to FIG. 8H, thereby allowing for simultaneous transmission.

Specifically, when the test power transfer to the plurality of power receivers 2A and 2B is ended, the power source calculates distribution conditions and transmits to the respective power receivers 2A and 2B (perform power transfer: ST220). Then, the power receiver 2A starts preparation of power reception, i.e., turns on the resonance coil 21aA and performs fine adjustment (ST221). The power receiver 2B starts preparation of power reception, i.e., turns on the resonance coil 21aB and performs fine adjustment (ST222).

The power source performs test power transfers (for example, 1.0%) to confirm the output of 10% (ST223), and checks abnormality by the sensor S3 (abnormality detection sensor), i.e., confirms no abnormal heat generation (ST224). The power receiver confirms power receptions of the power receivers 2A and 2B and transmits that the power receptions have been done (ST225).

The power source calculates efficiencies from the power receptions and the power transfers and confirms whether the efficiencies are within the estimated efficiencies 1 and 2 (ST226). In addition, the power source checks the sensor S2 (human detection sensor) and performs power transfer in a small power mode when there is a person (ST227), whereas performs a full power transfer (100% power transfer) when there is no person and confirms the output of 100% (ST228).

Additionally, the power source checks the sensor S3 (abnormality detection sensor) to confirm that there is no abnormal heat generation (ST229). The power receiver confirms power reception and transmits that the power reception has been done (ST230), and the power source calculates efficiencies from the power receptions and the power transfers to confirm whether the efficiencies are within the estimated efficiencies (ST231).

As described above, when the calculated efficiencies are not within the estimated efficiencies, the power source performs, for example, power transfer stop, alarm generation, abnormality display, and the like. Furthermore, the same processing will be performed also in similar confirmations on being within estimated efficiencies that will be described below.

Figure 21:
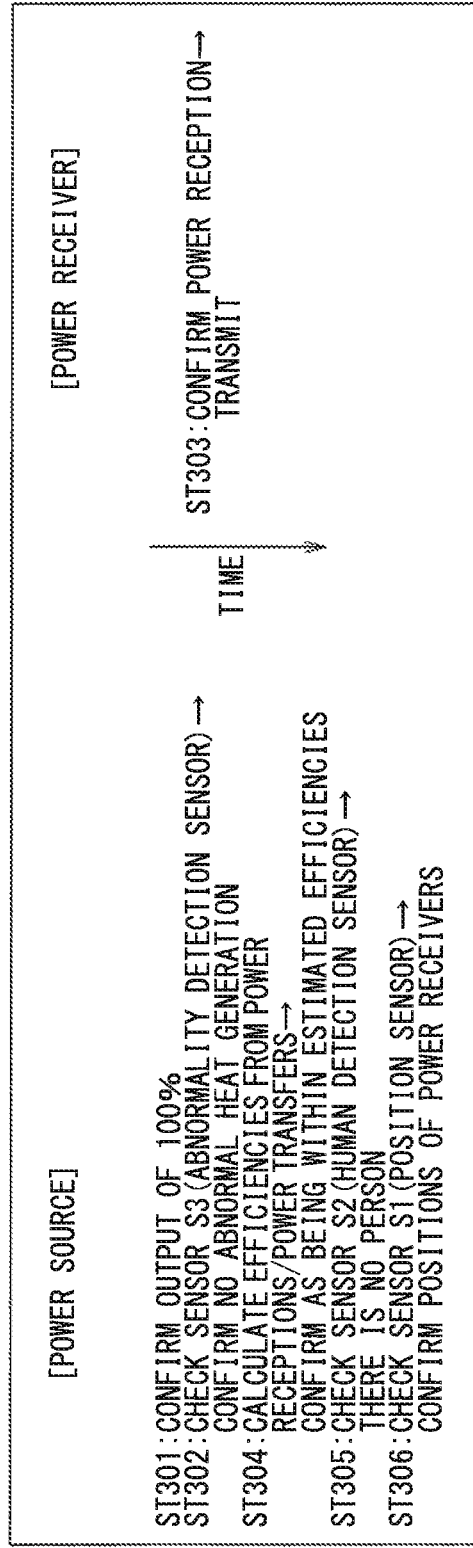
FIG. 21 is a flowchart for illustrating a third example of processing in the wireless power transfer system of the embodiment.

FIG. 21 is a flowchart for illustrating a third example of processing in the wireless power transfer system of the present embodiment, which illustrates processing by the sensor S2 (human detection sensor or biodetection sensor).

As depicted in FIG. 21, the power source confirms the output of 100% (ST301) and checks the sensor S3 (abnormality detection sensor) to confirm that there is no abnormal heat generation (ST302). Then, the power receiver confirms the power receivers 2A and 2B and transmits that the power receptions have been done (ST303).

The power source calculates efficiencies from the power receptions and the power transfers to confirm whether the efficiencies are within the estimated efficiencies (ST304). In addition, the power source checks the sensor S2 (human detection sensor) to confirm that there is no person (ST305) and then checks the sensor S1 (position sensor) to confirm positions of the power receivers (ST306).

Figure 22:
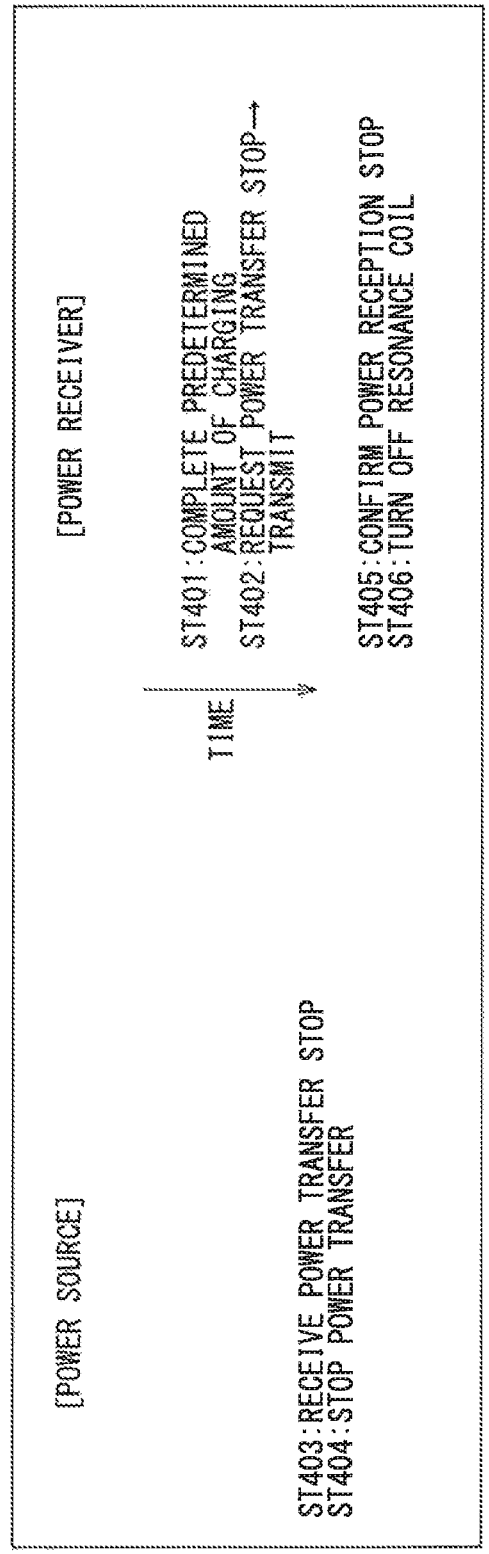
FIG. 22 is a flowchart for illustrating a fourth example of processing in the wireless power transfer system of the embodiment.

FIG. 22 is a flowchart for illustrating a fourth example of processing in the wireless power transfer system of the present embodiment, which illustrates processing performed after completion of a predetermined amount of charging in a power receiver.

As depicted in FIG. 22, upon completion of a predetermined amount of charging (ST401), the power receiver (power receiver) requests power transfer stop and transmits the power transfer stop request (ST402). The power source receives the power transfer stop from the power receiver (ST403) and stops power transfer (ST404). Then, the power receiver confirms power reception stop (ST405) and turns off the resonance coil (ST406).

Figure 23:
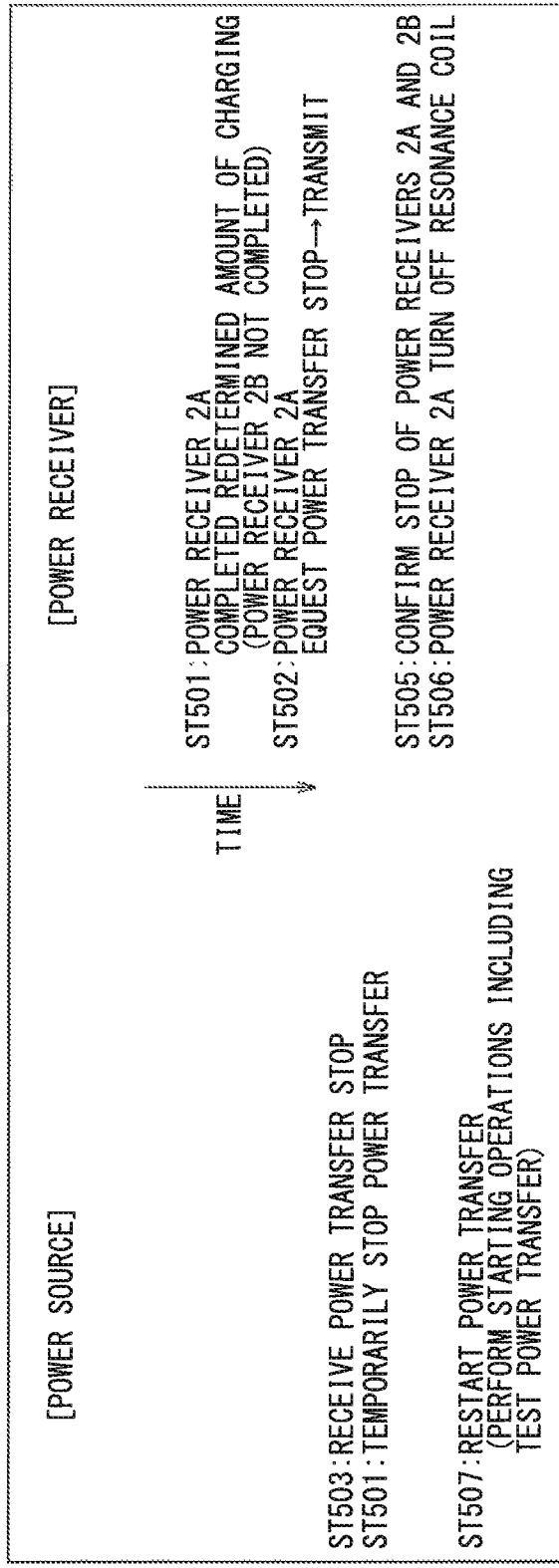
FIG. 23 is a flowchart for illustrating the fourth example of processing in the wireless power transfer system of the embodiment.

FIG. 23 is a flowchart for illustrating a fifth example of processing in the wireless power transfer system of the present embodiment, which illustrates processing performed after completion of a predetermined amount of charging in one of the two power receivers.

As depicted in FIG. 23, upon completion of a predetermined amount of charging in the power receiver 2A (ST501), the power receiver 2A requests power transfer stop and transmits the power transfer stop request (ST502). At this time, it is assumed that the power receiver 2B has not completed a predetermined amount of charging.

The power source receives the power transfer stop from the power receiver 2A (ST503) and temporarily stops power transfer (ST504). Then, the power receivers 2A and 2B confirm power reception stop (ST505), and the power receiver 2A turns off the resonance coil 11aA (ST506). The power source restarts power transfer in order to perform power transfer to the power receiver 2B (performs power transfer start operations including a test power transfer: ST507).

FIG. 24 is a flowchart for illustrating a sixth example of processing in the wireless power transfer system of the present embodiment, which illustrates processing performed for a device with a battery residual capacity of zero. The processing for the device with a battery residual capacity of zero does not use information given by the position sensor S1 and the acceleration sensor SA.

As depicted in FIG. 24, during power transfer to each device by the power source (ST601), each device of the power receiver is receiving power (ST602). Next, a user places a device (power receiver) with a battery residual capacity of zero near the power sources (ST603). A position at which the power receiver with the battery residual capacity of zero is placed near the power sources is a predetermined power reception position designated in advance.

Furthermore, the user turns on the battery residual capacity zero switch (ST604), whereby the power source stops power transfer (ST605) and communicates turning off of the resonance coils to the entire power reception system (the power receivers) (ST606). The power receiver turns off the resonance coils of all the power receivers (all the power receivers except for the power receiver with the battery residual capacity of zero) (ST607).

The power source (master power source) decides that the power receiver with the battery residual capacity of zero is located at the predetermined position, then estimates a relative positional relationship (ST608), and performs an initial setting of matching conditions (ST609). In other words, the power source transmits power to the power receiver with the battery residual capacity of zero, for example, using electromagnetic induction coupling.

In addition, the power source performs initial settings of a strength and a phase of each power transfer coil (ST610), then performs a test power transfer (for example, 10%) to confirm the output of 10% (ST611), and checks abnormality by the sensor S3 (abnormality detection sensor), i.e., confirms no abnormal heat generation (ST612).

The master power source checks the sensor S2 (human detection sensor) and performs power transfer in a small power mode when there is a person (ST613), and performs a full power transfer RT1 (for example, 5 W) when there is no person and confirms the output of 5 W (ST614). Then, the master power source checks abnormality by the sensor S3 (abnormality detection sensor), i.e., confirms no abnormal heat generation (ST615).

Next, the master power source continues the full power transfer RT1 (for example, 5 W) for a predetermined time (for example, about 5 minutes) to confirm communication to the power receivers (ST616). This confirmation may be made by checking impedance stability (ST617). In the power receiver (the power receiver with the battery residual capacity of zero), for example, when charging is insufficient, communication remains impossible (ST618).

Furthermore, the master power source performs a full power transfer RT2 (for example, 10 W) to confirm the output of 10 W (ST619), and checks abnormality by the sensor S3 (abnormality detection sensor), i.e., confirms no abnormal heat generation (ST620).

Then, the master power source continues the full power transfer RT2 (for example, 10 W) for a predetermined time (for example, about 5 minutes) to confirm communication to the power receivers (ST621). This confirmation may be made by confirming impedance stability (ST622). In the power receiver (the power receiver with the battery residual capacity of zero), for example, when charging proceeds, the power receiver whose battery residual capacity had been zero responds to communication (ST623).

The power source continues ordinary power transfer to a single power receiver only for a predetermined time (ST624). Power transfer to the power receiver with the battery residual capacity of zero may be performed until full charging of the battery is completed by power transfer using electromagnetic induction. However, alternatively, after the charging proceeds to some extent (up to a communicable level), the power transfer may be switched to a power transfer using resonance.

Then, the power source stops power transfer (ST625) and restarts processing from starting of ordinary power transfer (ST626), i.e., executes processing described with reference to FIG. 19 to FIG. 23 described above.

While the embodiment has been described above, all examples and conditional language recited herein are intended to aid the reader in understanding the concept of the present invention applied to the invention and the technique. Such specifically recited examples and conditions are not to be construed as limiting the scope of the invention nor do the configurations of the examples herein indicate merits and demerits of the invention. Although the embodiment of the invention has been detailed, it is to be understood that various changes, replacements, and modifications can be made thereto without departing from the spirit and the scope of the invention.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A wireless power transfer system comprising:
    a plurality of power sources; and
    a power receiver,
    power transfer from at least one of the plurality of power sources to the power receiver being performed in wireless by using magnetic field resonance or electric field resonance, wherein
    the power receiver is configured to communicate with the plurality of power sources;
    one of the plurality of power sources is designated as a master power source and the other one or more power sources are designated as slave power sources based on information of the power receiver receiving at least two of the plurality of power sources detected by the power receiver, and the at least two of the plurality of power sources are configured to transmit power to the power receiver; and
    the master power source controls at least one of the plurality of power sources and performs the power transfer to the power receiver.

2. The wireless power transfer system as claimed in claim 1, wherein
    the plurality of power sources include a wireless power transfer unit configured to wirelessly transmit power by using magnetic field resonance or electric field resonance, respectively; and
    the power receiver includes a wireless power reception unit configured to receive the power wirelessly transmitted by using the magnetic field resonance or the electric field resonance.

3. The wireless power transfer system as claimed in claim 1, wherein
    each of the plurality of power sources includes a first communication circuit unit configured to perform communication with other one or more of the power sources and with the power receiver; and
    the power receiver includes a second communication circuit unit configured to perform communication with the plurality of power sources.

4. The wireless power transfer system as claimed in claim 1, wherein
    the master power source receives
        information of a plurality of power transfer areas configured to indicate ranges capable of performing the power transfer by the plurality of power sources,
        information of a plurality of communication areas configured to indicate communicable ranges by the plurality of power sources, and
        position information configured to indicate a position of the power receiver and performs the power transfer.

5. The wireless power transfer system as claimed in claim 1, wherein
    the master power source further receives information of a biodetection range detecting a living body within the plurality of power transfer areas to perform the power transfer.

6. The wireless power transfer system as claimed in claim 1, wherein
    the master power source further receives posture information of a power receiver as a destination of the power transfer to perform the power transfer.

7. The wireless power transfer system as claimed in claim 1, wherein
    the master power source is designated when power transfer areas of at least two of the plurality of power sources overlap and at least one power receiver is included in the overlapped power transfer area.

8. The wireless power transfer system as claimed in claim 1, wherein,
    of the plurality of power sources, a power source capable of communicating with a largest number of power sources is selected as the master power source.

9. The wireless power transfer system as claimed in claim 1, wherein
    when the power receiver is a power receiver with a battery residual capacity of zero, the power receiver with the battery residual capacity of zero is arranged in contact with one of the plurality of power sources.

10. The wireless power transfer system as claimed in claim 1, wherein
    each of the plurality of power sources includes an oscillator and a synchronization circuit; and
    when the plurality of power sources perform the power transfer to the power receiver,
    one of the plurality of power sources is designated as a primary power source and the other one or more power sources are designated as secondary power sources;
    the primary power source performs the power transfer according to a frequency of the oscillator; and
    the secondary power sources synchronize the synchronization circuits of the secondary power sources with the frequency of the oscillator of the primary power source to perform the power transfer according to a frequency of the synchronization circuits of the secondary power sources in which the frequency has been synchronized therewith.

11. A wireless power transfer method comprising a plurality of power sources and a power receiver, in which power transfer from at least one of the plurality of power sources to the power receiver is performed in wireless by using magnetic field resonance or electric field resonance, wherein the power receiver is configured to communicate with the plurality of power sources, and the wireless power transfer method comprising:
    designating one of the plurality of power sources as a master power source and the other one or more power sources as slave power sources based on information of the power receiver receiving at least two of the plurality of power sources detected by the power receiver, and the at least two of the plurality of power sources are configured to transmit power to the power receiver; and
    controlling, by the master power source, the plurality of power sources and performing the power transfer to the power receiver.

12. The wireless power transfer system as claimed in claim 1, wherein
the master power source further determines outputs of the master power source and the slave power sources, and the master power source and the slave power sources perform the power transfer to the power receiver by the determined outputs of the master power source and the slave power sources.

13. The wireless power transfer system as claimed in claim 1, wherein
the power receiver is configured to communicate with the plurality of power sources,
at least one of the plurality of power sources receives information of at least two of the plurality of power sources detected by the power receiver, at least two of the plurality of power sources enabling to transmit power to the power receiver, and one of the plurality of power sources is designated as a master power source and the other one or more power sources are designated as slave power sources.

14. The wireless power transfer system as claimed in claim 2, wherein
the wireless power transfer system further comprises a power supply unit, and a power transfer control unit configured to control the power supply unit and the wireless power transfer unit, and
the wireless power transfer unit includes an LC resonator, wherein
the power transfer control unit controls the LC resonator of the wireless power transfer unit not to operate when power transfer is not performed.

15. The wireless power transfer system as claimed in claim 2, wherein
the wireless power transfer system further comprises a power reception circuit unit configured to extract power from the wireless power reception unit, and a power reception control unit configured to control the power reception circuit unit, and
the wireless power reception unit includes an LC resonator, wherein
the power reception control unit controls the LC resonator of the wireless power reception unit not to operate when power transfer is not performed.

16. A wireless power transfer system comprising:
a plurality of power sources; and
a power receiver,
power transfer from at least one of the plurality of power sources to the power receiver being performed in wireless by using magnetic field resonance or electric field resonance, wherein
the power receiver is configured to communicate with the plurality of power sources;
one of the plurality of power sources is designated as a master power source and the other one or more power sources are designated as slave power sources based on information of at least two of the plurality of power sources detected by the power receiver, and the at least two of the plurality of power sources are configured to transmit power to the power receiver; and
the master power source controls at least one of the plurality of power sources and performs the power transfer to the power receiver, wherein
the plurality of power sources include a wireless power transfer unit configured to wirelessly transmit power by using magnetic field resonance or electric field resonance, respectively; and
the power receiver includes a wireless power reception unit configured to receive the power wirelessly transmitted by using the magnetic field resonance or the electric field resonance, wherein
the wireless power transfer system further comprises at least another one of power receiver, wherein
the master power source controls an LC resonator of at least another one of power receiver not to operate when receiving a state of the battery residual capacity of zero from one of the plurality of power sources where the power receiver is contacted and charged by using electromagnetic induction coupling.

17. The wireless power transfer method as claimed in claim 11, wherein
the master power source further determines outputs of the master power source and the slave power sources, and the master power source and the slave power sources perform the power transfer to the power receiver by the determined outputs of the master power source and the slave power sources.

18. The wireless power transfer method as claimed in claim 11, wherein
the power receiver is configured to communicate with the plurality of power sources,
at least one of the plurality of power sources receives information of at least two of the plurality of power sources detected by the power receiver, at least two of the plurality of power sources enabling to transmit power to the power receiver, and one of the plurality of power sources is designated as a master power source and the other one or more power sources are designated as slave power sources.

19. The wireless power transfer method as claimed in claim 11, wherein
the master power source receives
information of a plurality of power transfer areas configured to indicate ranges capable of performing the power transfer by the plurality of power sources,
information of a plurality of communication areas configured to indicate communicable ranges by the plurality of power sources, and
position information configured to indicate a position of the power receiver and performs the power transfer.

20. The wireless power transfer method as claimed in claim 11, wherein
the master power source further receives information of a biodetection range detecting a living body within the plurality of power transfer areas to perform the power transfer.

* * * * *